March 22, 1960    J. K. WOOD    2,929,594
SPRING SUPPORT
Filed July 18, 1957    16 Sheets-Sheet 1
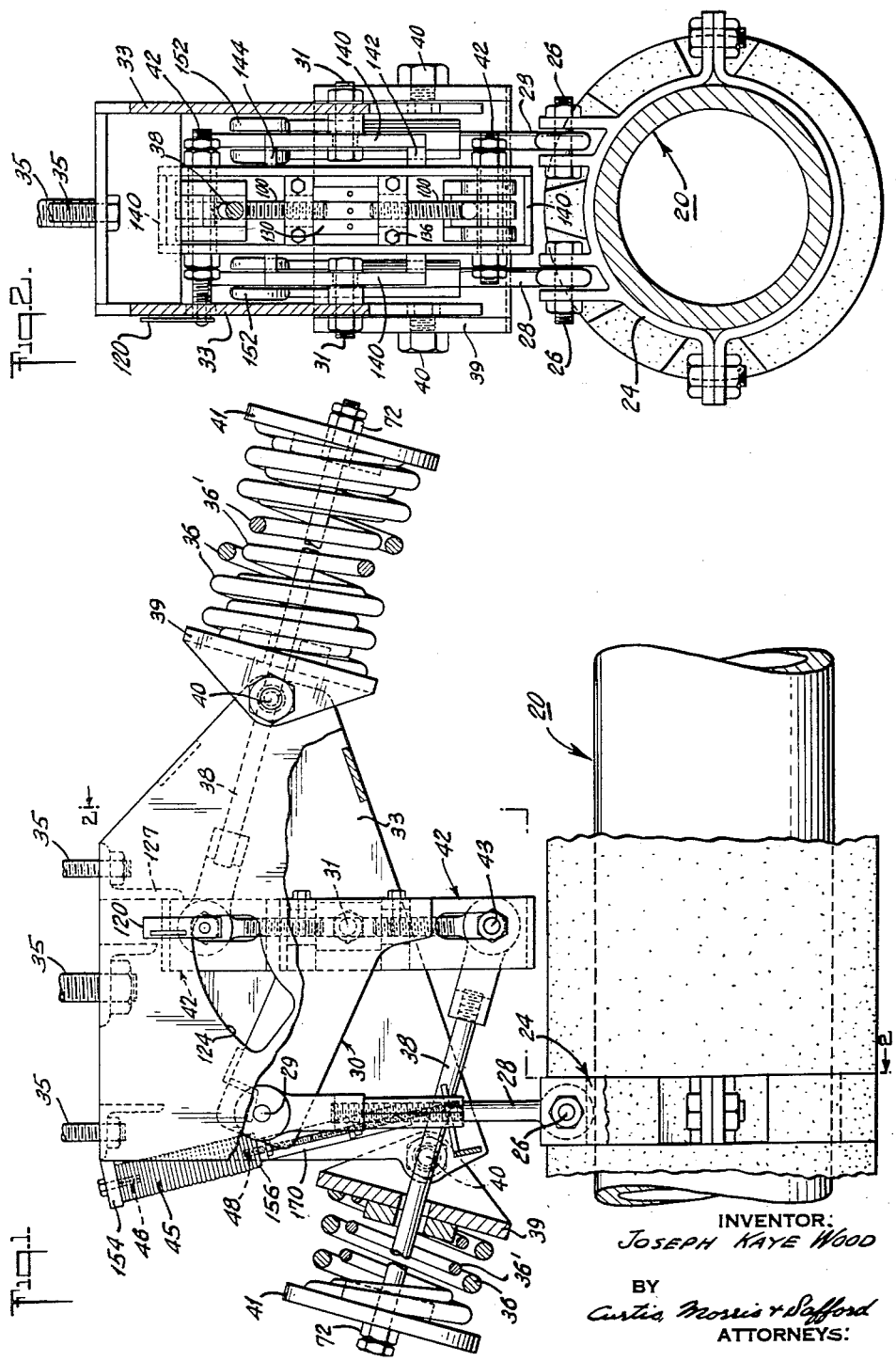
INVENTOR:
JOSEPH KAYE WOOD
BY
Curtis, Morris + Safford
ATTORNEYS:

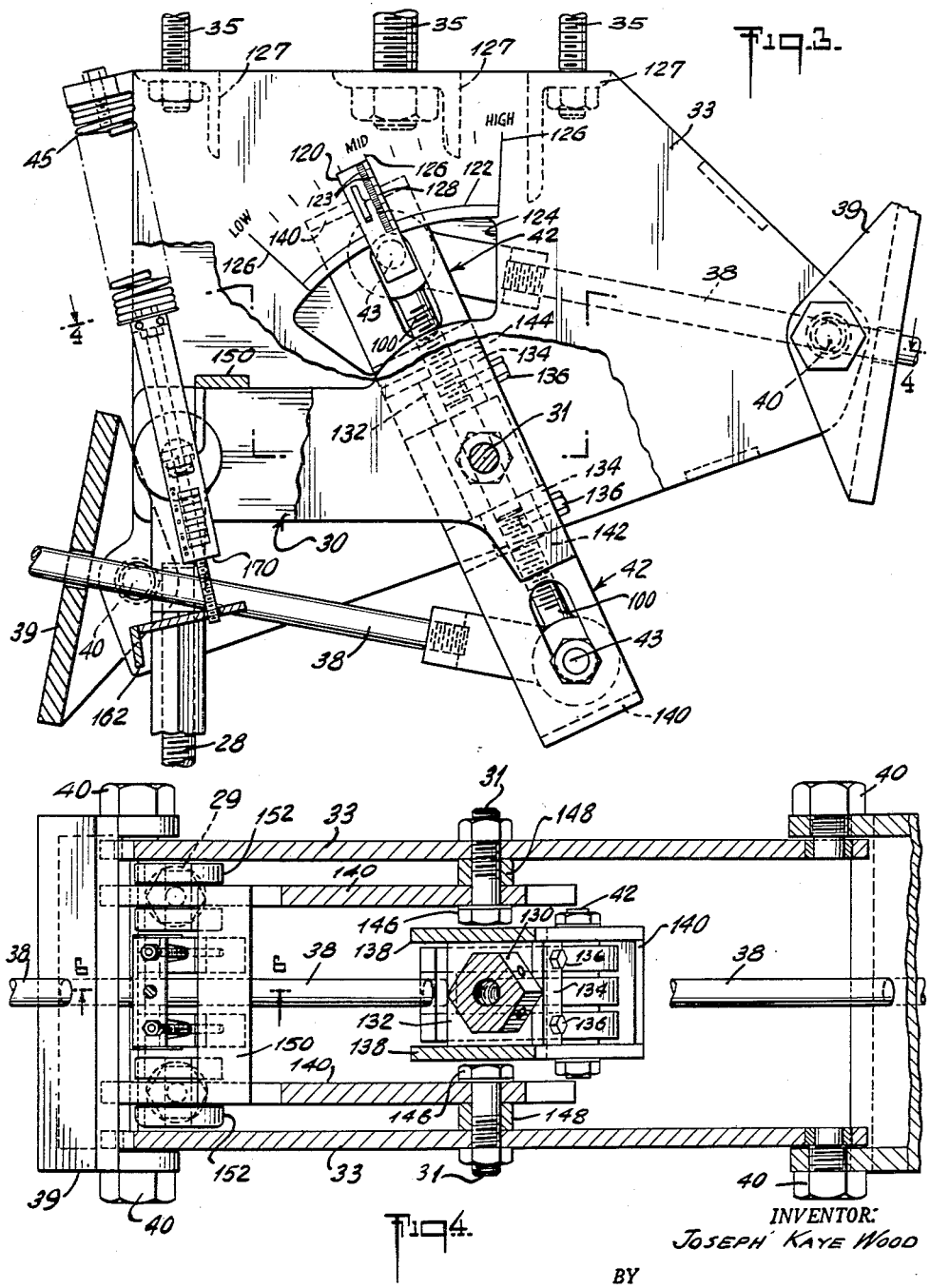

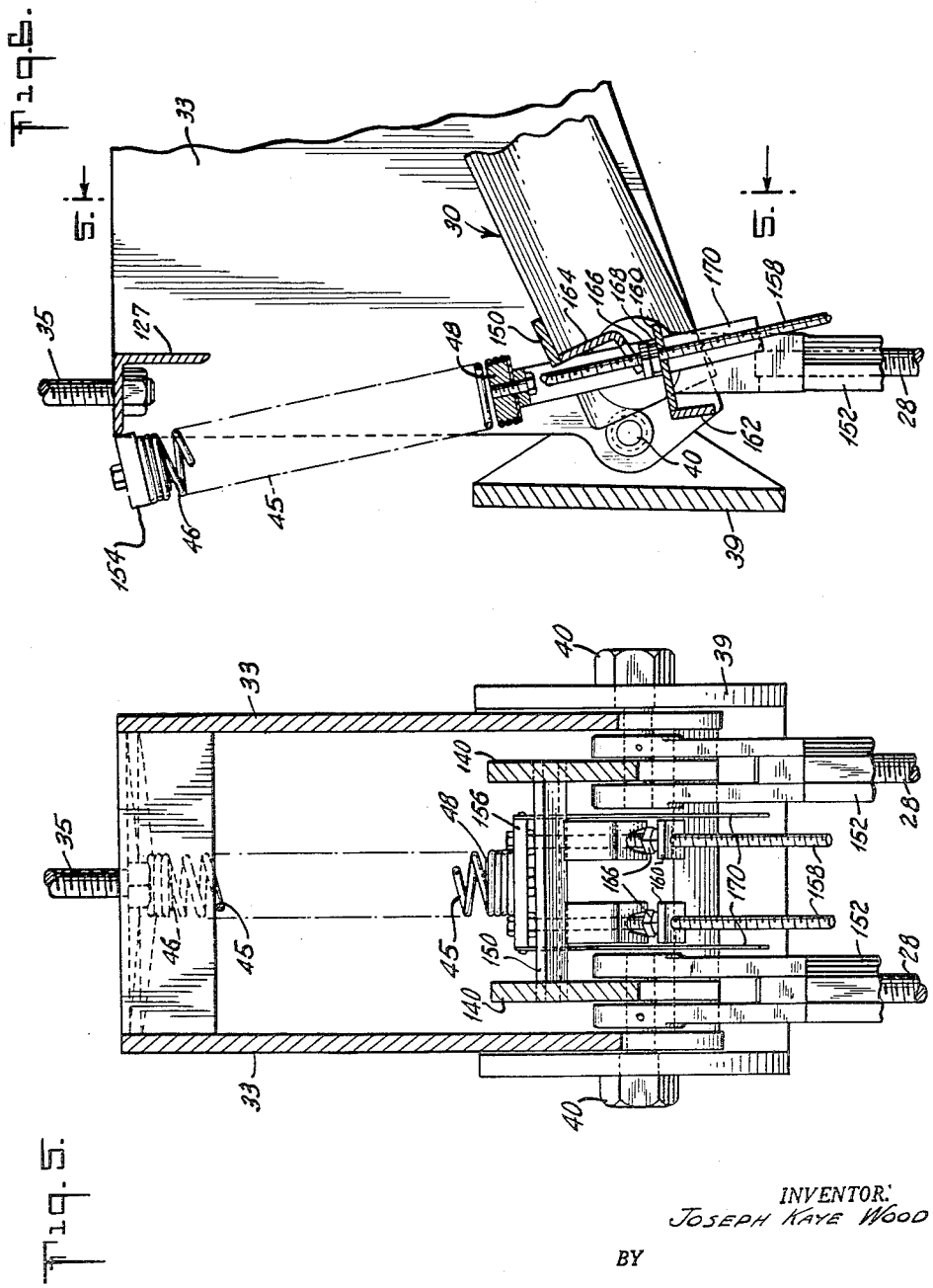

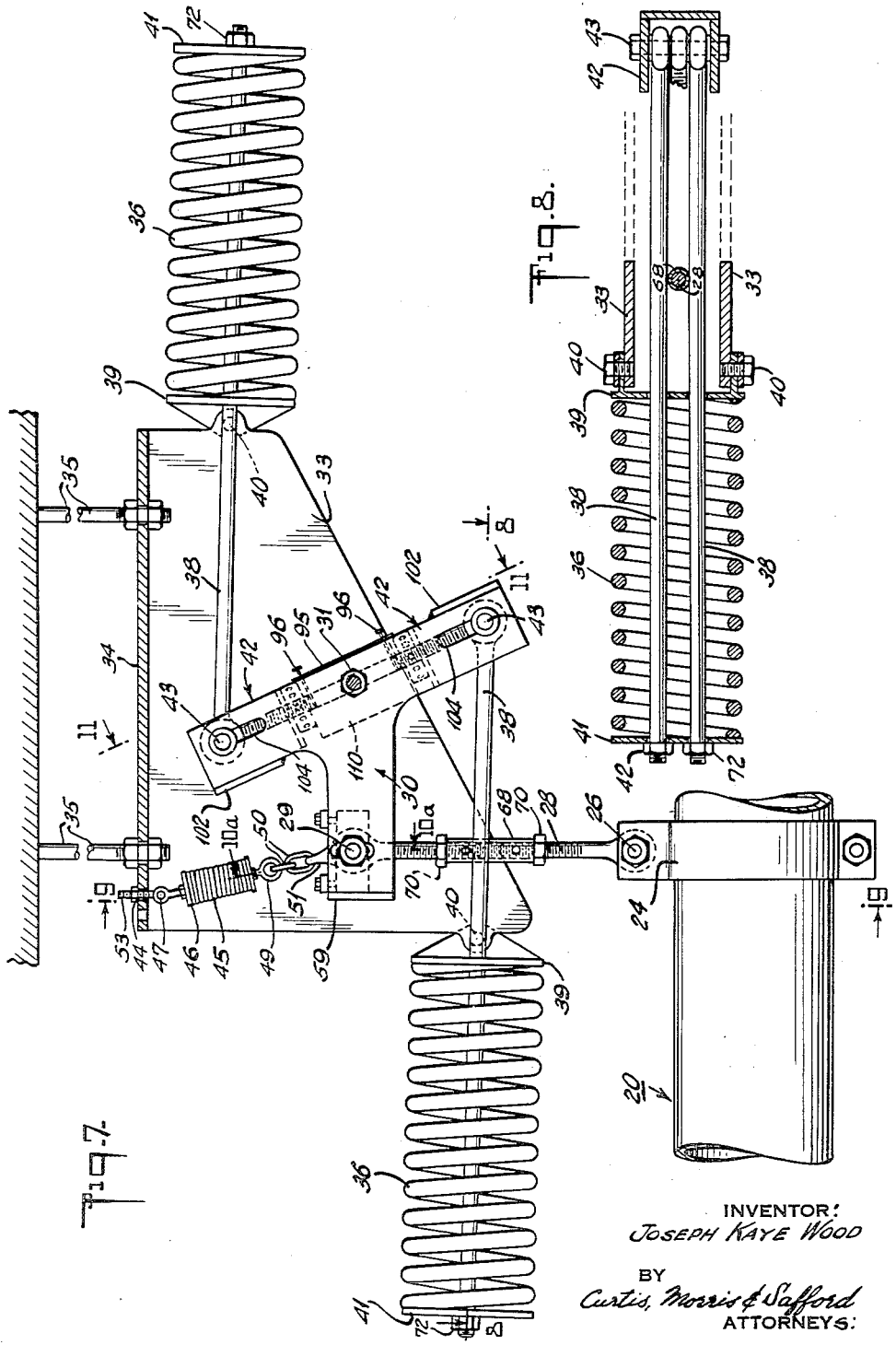

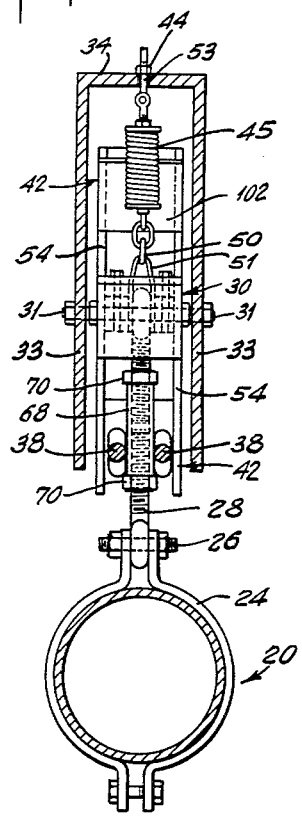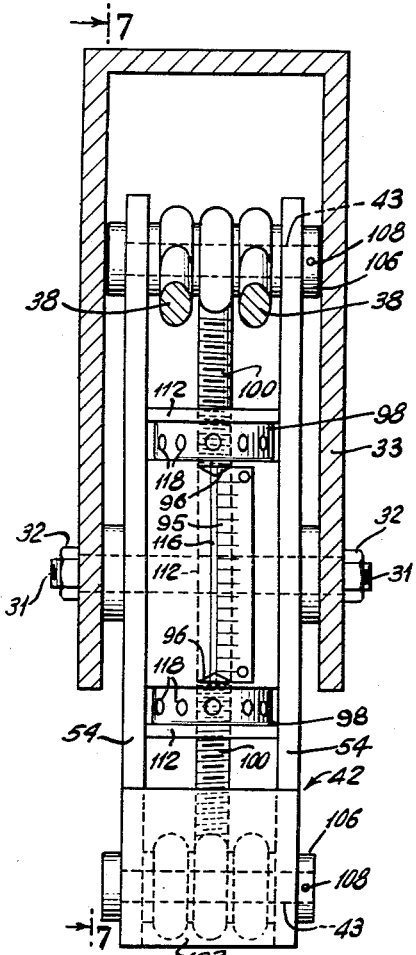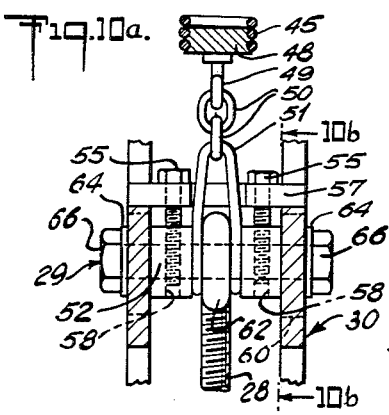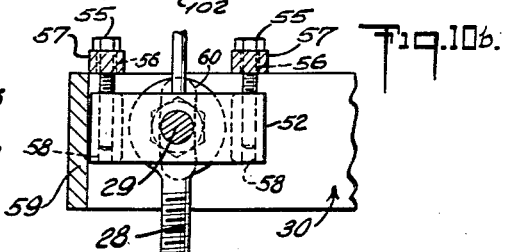

March 22, 1960  J. K. WOOD  2,929,594
SPRING SUPPORT
Filed July 18, 1957  16 Sheets-Sheet 6
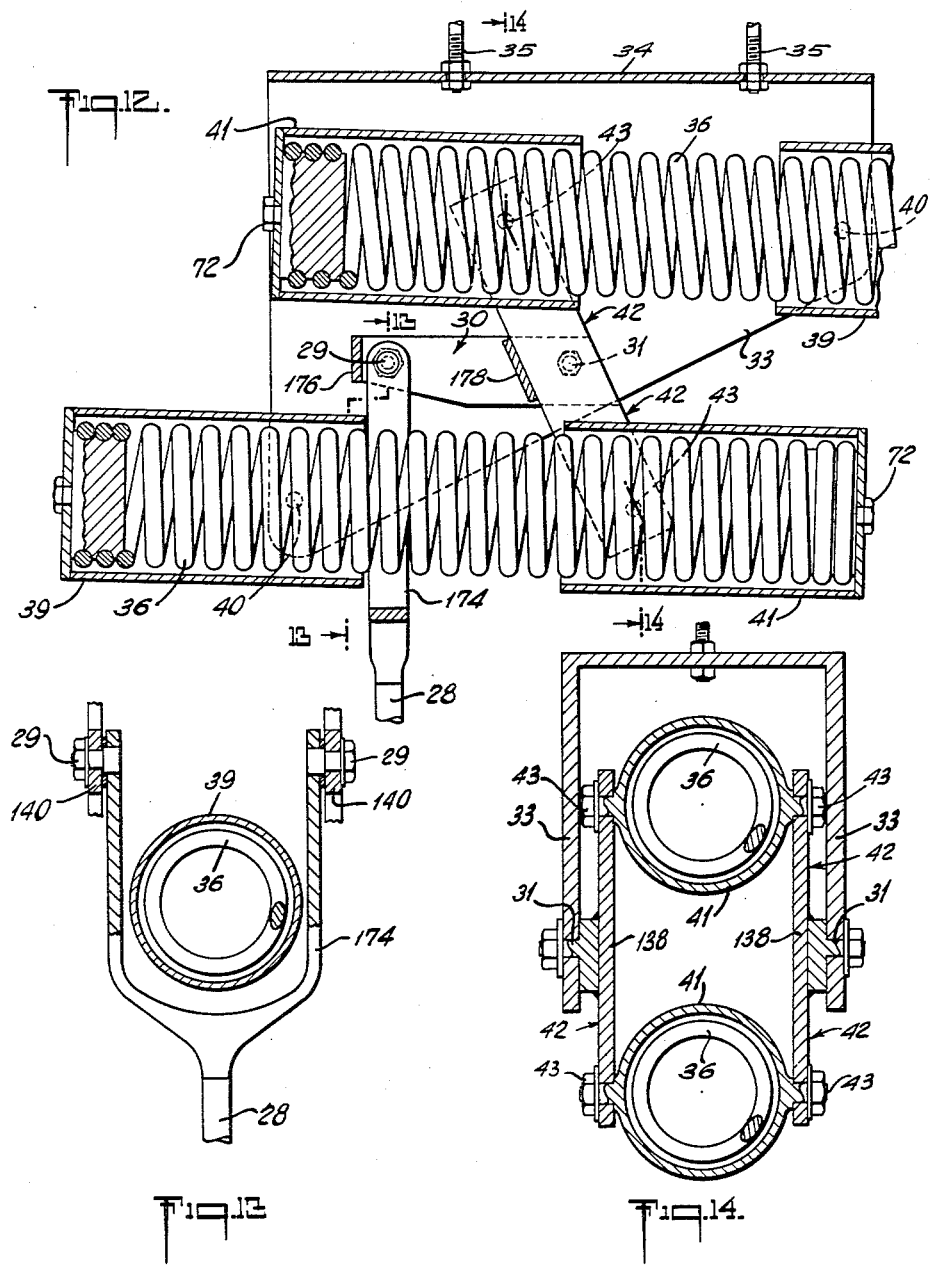
INVENTOR:
JOSEPH KAYE WOOD
BY
Curtis, Morris & Safford.
ATTORNEYS

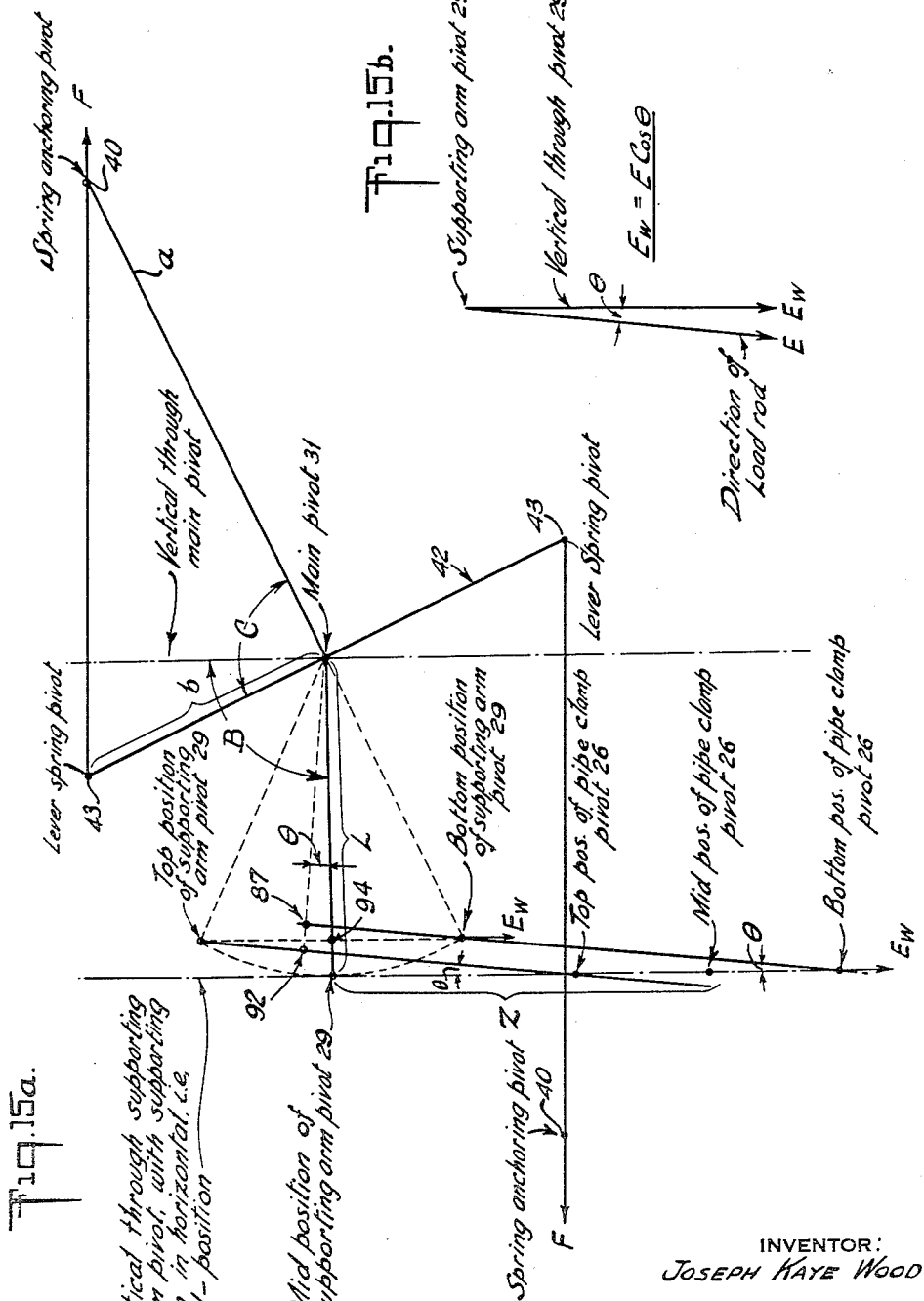

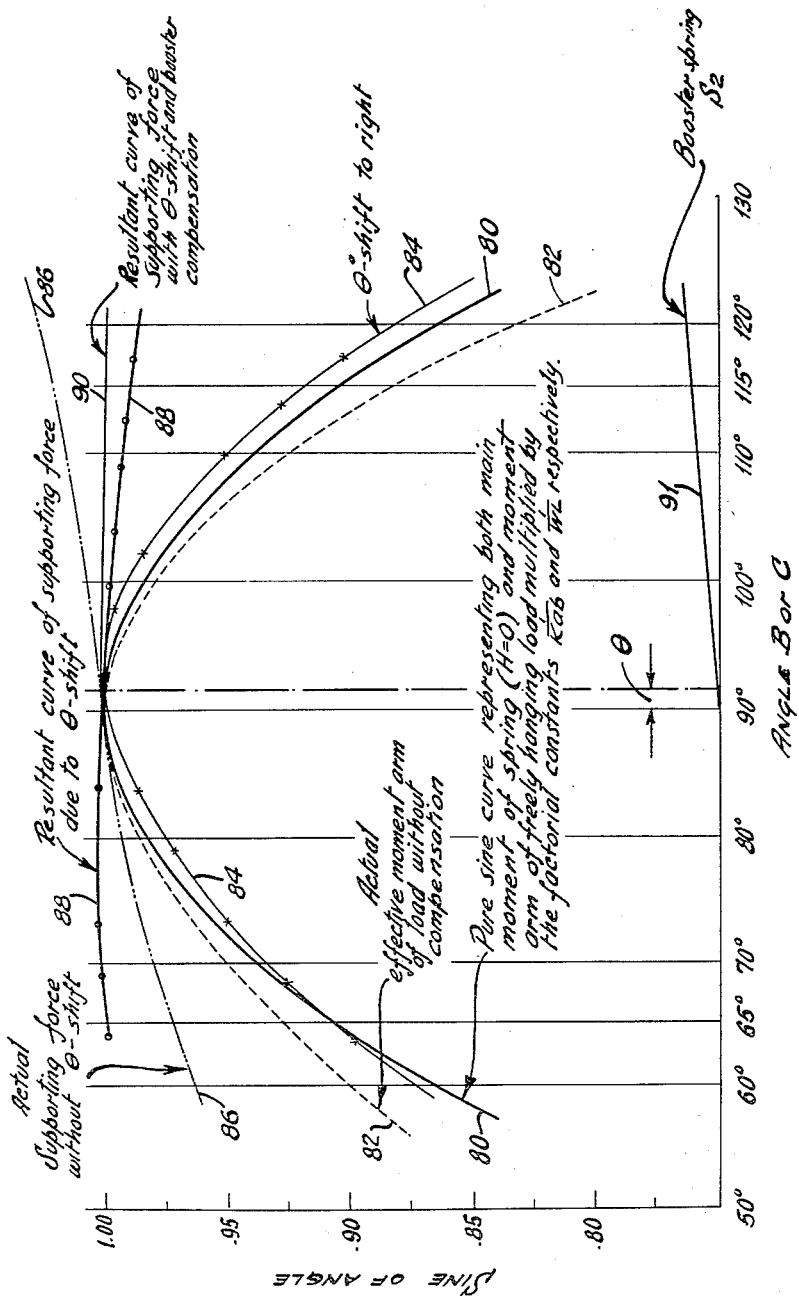

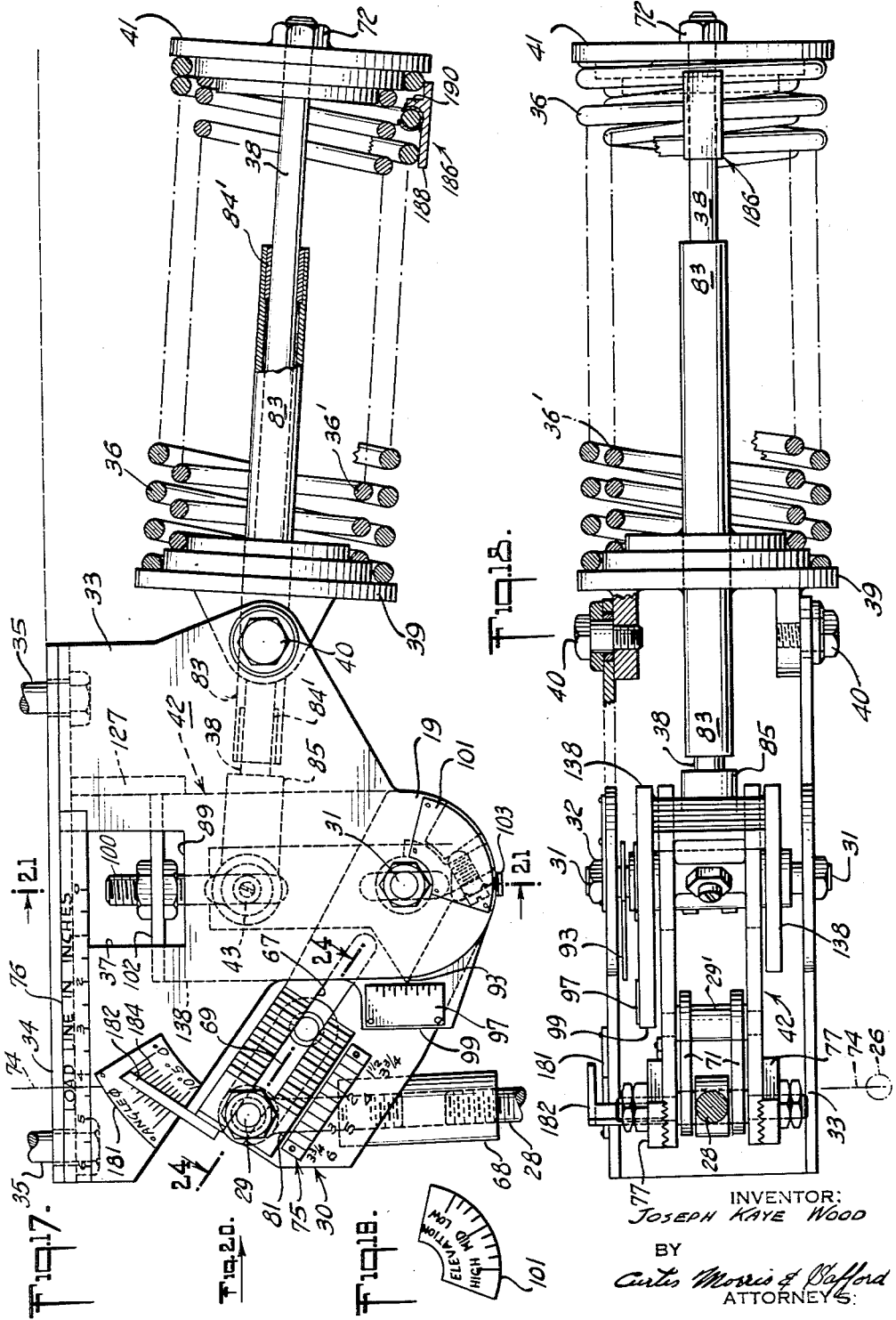

March 22, 1960   J. K. WOOD   2,929,594
SPRING SUPPORT
Filed July 18, 1957   16 Sheets-Sheet 10
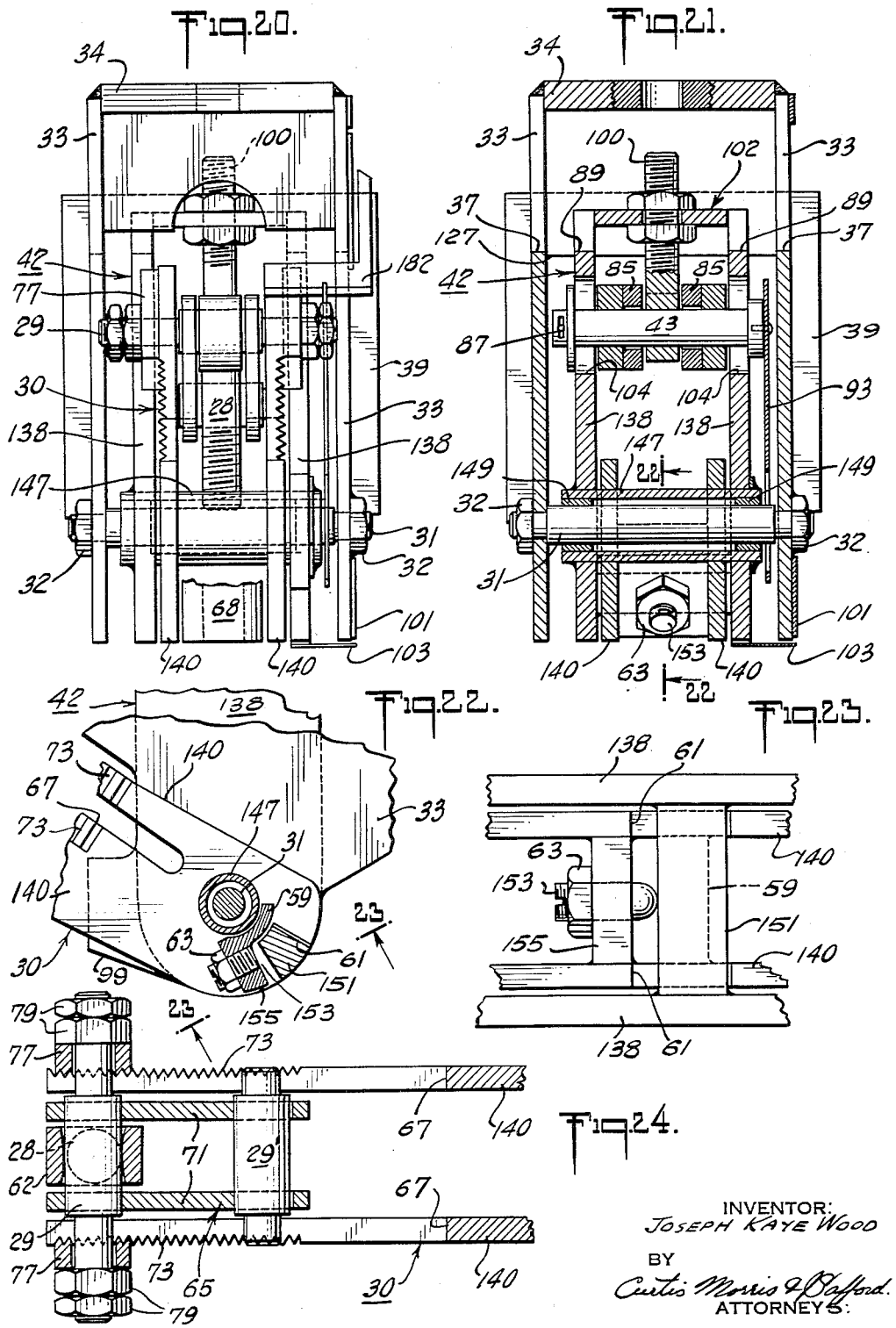
INVENTOR:
JOSEPH KAYE WOOD
BY
Curtis Morris & Safford
ATTORNEYS March 22, 1960     J. K. WOOD     2,929,594
SPRING SUPPORT
Filed July 18, 1957     16 Sheets-Sheet 11
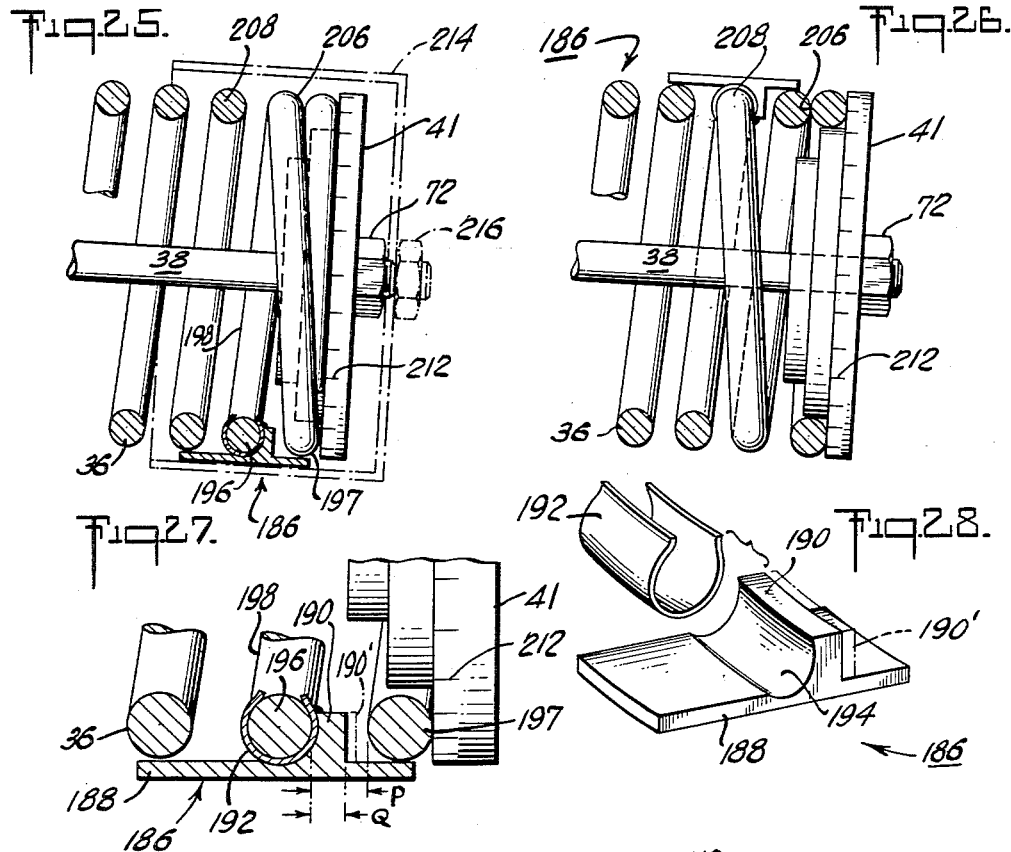
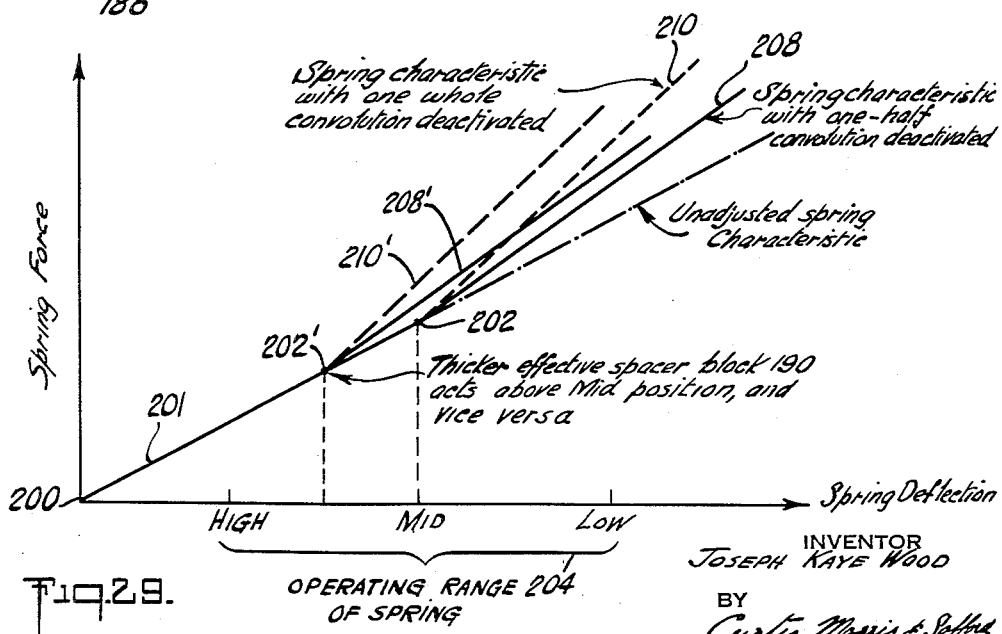
INVENTOR
JOSEPH KAYE WOOD March 22, 1960 J. K. WOOD 2,929,594
SPRING SUPPORT
Filed July 18, 1957 16 Sheets-Sheet 12

INVENTOR:
JOSEPH KAYE WOOD
BY
Curtis, Morris & Safford.
ATTORNEYS:

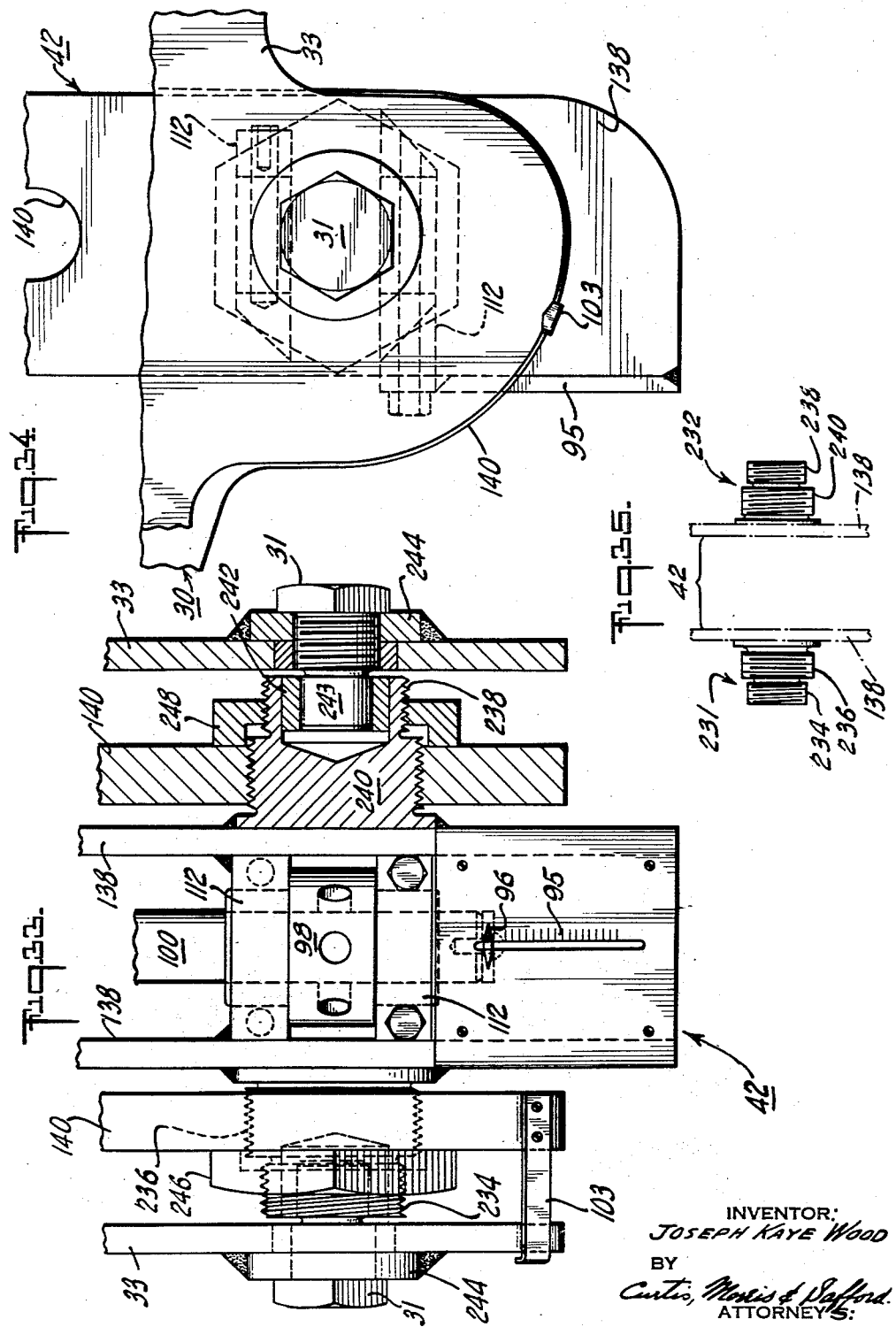

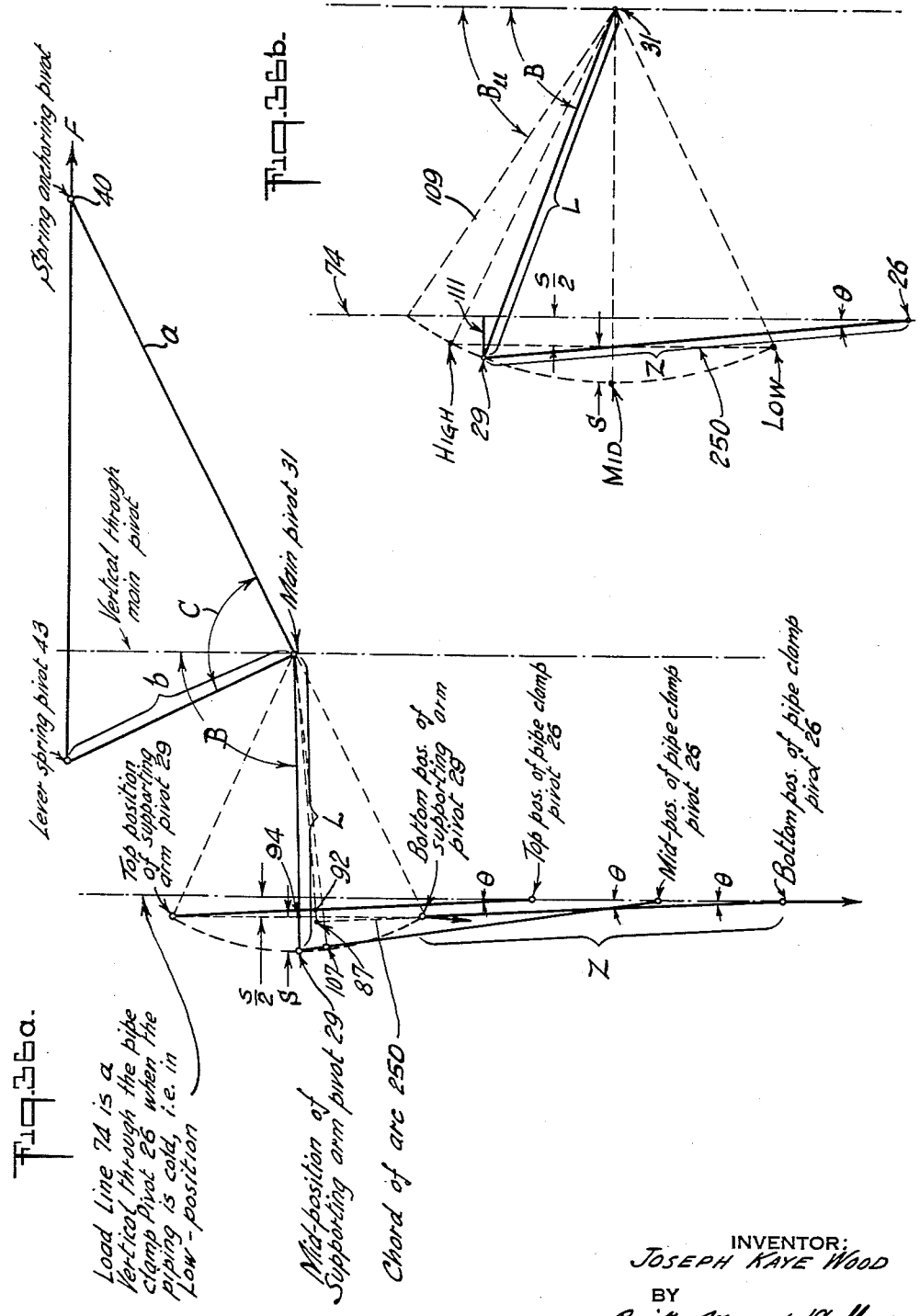

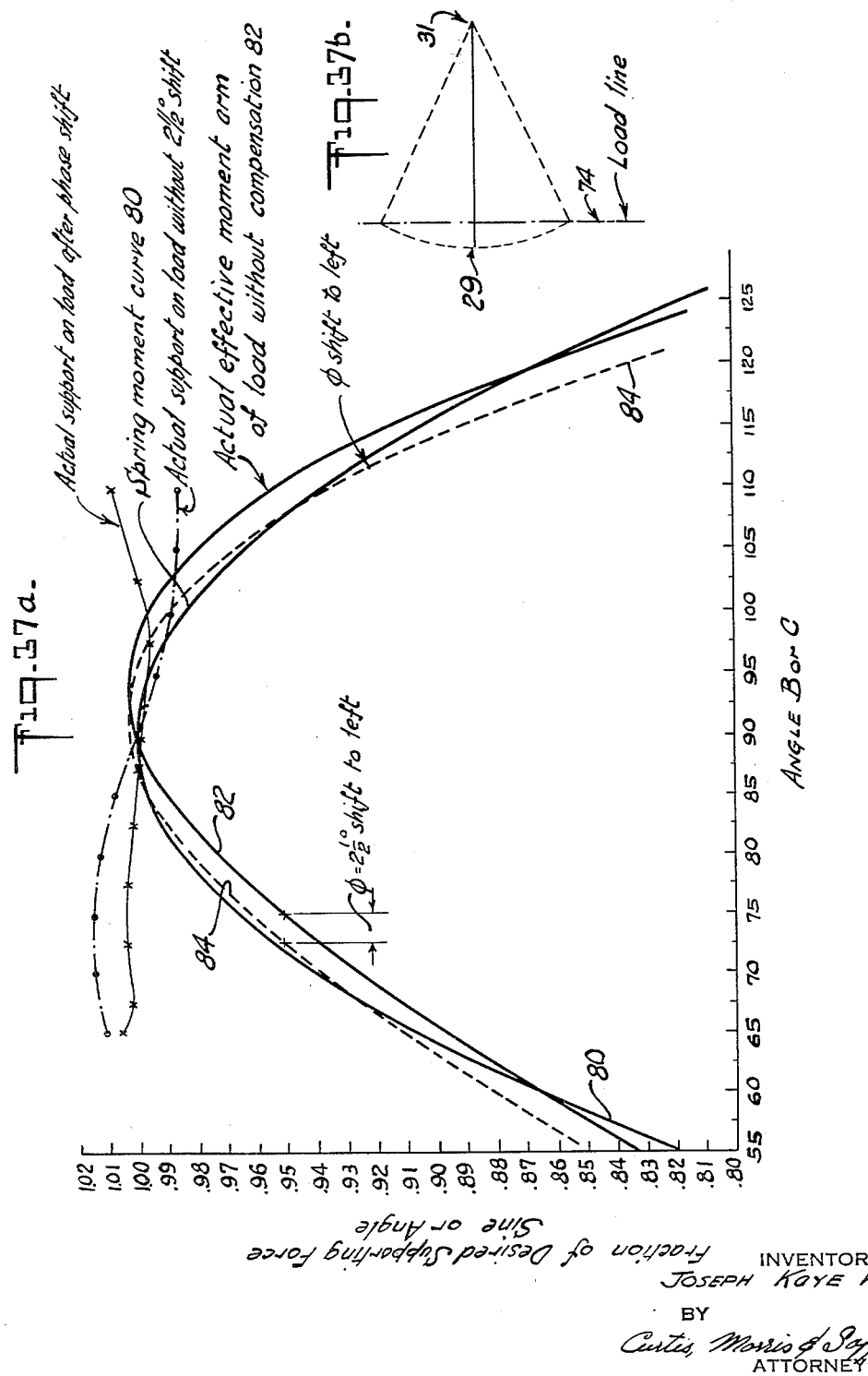

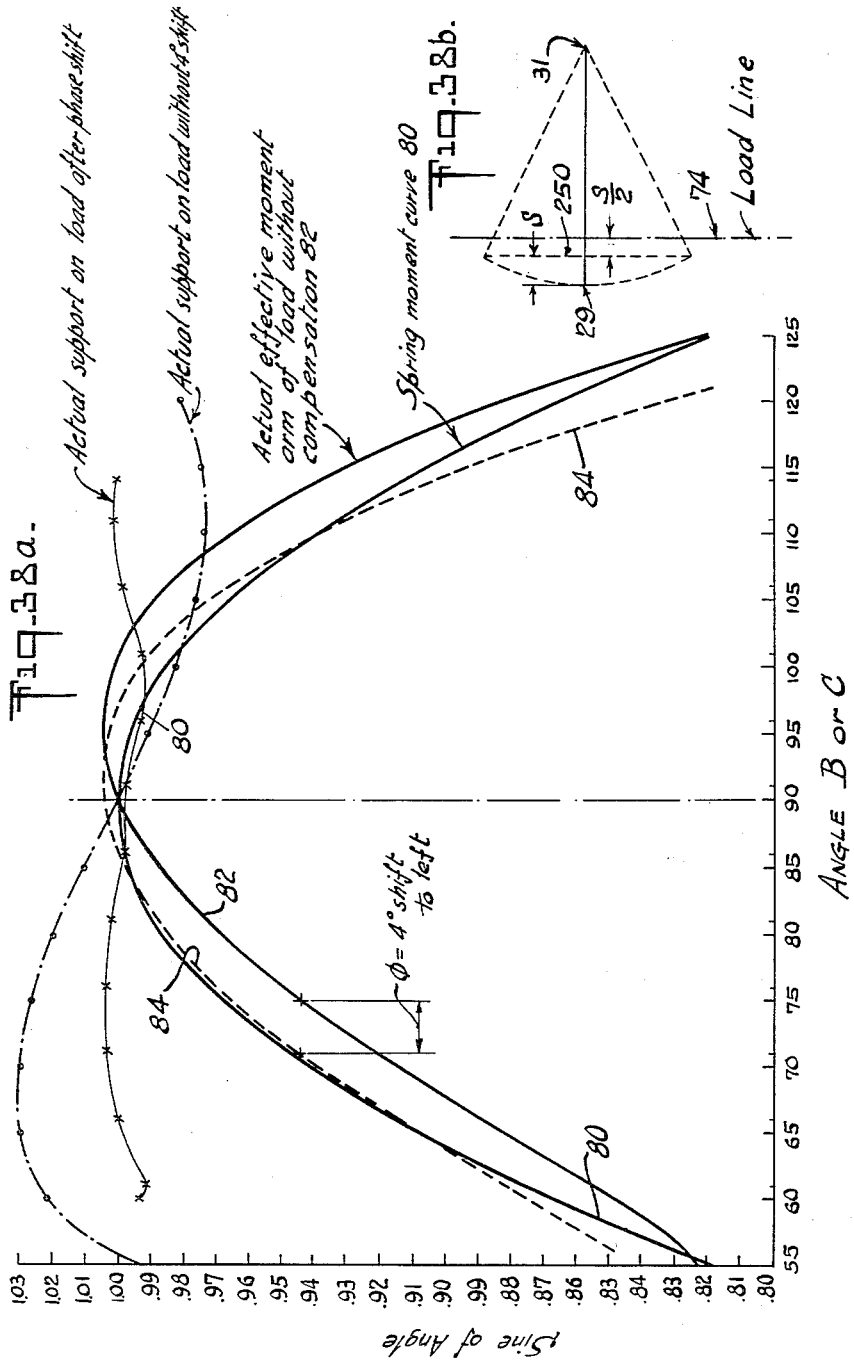

United States Patent Office 2,929,594
Patented Mar. 22, 1960

2,929,594

SPRING SUPPORT

Joseph Kaye Wood, Westover Park, Conn., assignor to General Spring Corporation, New York, N.Y.

Application July 18, 1957, Serial No. 672,758

17 Claims. (Cl. 248—54)

This invention relates to a support for piping and the like, and more particularly to a spring balanced support which permits movement of the supported load up and down for a substantial distance, while affording to the load a more nearly constant supporting force.

The present invention provides an improved constant support having capacity for large loads, or for small, and able to accommodate large or small movements of the supported object, having relatively low static friction, and capable of easily made adjustment while maintaining a constant supporting force in spite of the arcuate movements of the supporting arm and of the radius and amplitude of horizontal movements of the point of connection to the supported object from the supporting arm, within the operating range.

With the continued advances in design of steam power plants, chemical processes, and the like, resulting in larger piping, greater amplitudes of travel of the piping due to thermal expansion and contraction, along with higher temperatures and pressures, there has been a continuing and increasing interest in obtaining a more perfectly constant support for the piping. For example, as set forth in my prior Patents Nos. 1,816,164; 1,937,137; 2,145,704; 2,156,468; 2,208,064; 2,256,784; 2,335,834; and 2,439,067 there are several variable factors in constant support hangers which already have been considered and compensated for in order to approach a truly constant supporting action. However, there are still significant variable factors, discussed below, which have not been considered in the art and which are comparable in magnitude to the compensation factors discussed in these patents. These new factors have become very important because of the increase in weights and sizes of pipe, fittings, coverings, amount of expansion, etc. which are present in modern piping installations.

Prior to the present invention the art has customarily treated piping as if it were a freely suspended load always hanging directly below the end of the support arm or, where horizontal movement of the load has been considered, has used rollers or the like to accommodate this horizontal travel, which arrangements often may be unsatisfactory for reasons discussed below.

I have found that sizable deviations in the actual support force can occur in spring supports because of (a) arcuate travel of the support-arm load pivot, herein called the arcing factor, (b) distance between the pivot connection to the supported object and the support-arm load pivot, i.e., load rod length and (c) horizontal movement of this pivot connection relative to the support-arm load pivot. These latter two factors may also be considered as a function of the radius and amplitude of horizontal movement of the point of connection to the load relative to the support-arm load pivot. ("Pivot" being the center of articulation about which the connected part is rotatable.)

The use of rollers to enable the support to follow horizontal travel of the load is often unsatisfactory because of the added cost and space needed, and the load often travels a considerable distance before a sufficiently large horizontal component of force is developed to cause them to roll. Furthermore, they do not show at a distance whether they are operable or rusted or binding.

The interaction of these factors set forth above can be visualized by considering the typical support hanger in which the load force is caused to act upon one arm of a pivoted bell crank lever, called the supporting arm, and one or more springs act upon another arm, called the spring arm, producing a moment about the main pivot for the bell crank to oppose the load moment and thus support the load. The load does not act vertically at all times, as it would if the piping were a freely suspended load. The point at which the load moment reaches a maximum depends upon the amount by which the pull of the load deviates from the vertical. The actual load moment at other positions depends, of course, on the angle of the supporting arm to the line of pull of the load. These are affected by the length of the supporting arm, the extent of vertical and horizontal travel of the point of connection to the load and the distance between this point of connection and the supporting-arm load pivot, all of which may vary from installation to installation.

Thus, the moment exerted on the bell crank by an actual piping system is considerably different from that of a freely hanging body. Similarly, the moment about the main pivot caused by the main spring or springs varies in a manner which follows a true sine curve if the spring is arranged so that its distortion is equal to the distance between the spring-anchoring pivot point and the point of connection of the spring to the spring arm. This is called the $H=0$ condition and the spring moment is modified from a sine curve to the extent that the spring is distorted from the $H=0$ condition, shown by the curves in Figure 5 of my Patent No. 1,937,135. This follows from the curves and mathematical analysis given in my prior patents. In accordance with aspects of my invention, the spring and load moment curves are enabled to be adjusted substantially into coincidence and much more nearly constant supporting action occurs than in prior devices.

Advantageously, these adjustments may readily be made at installation. This fact, coupled with the resulting constancy of support obtained, reduces the engineering calculations necessary in laying out a plant or process, and yet provides more precisely known safety factors, which is most important in the modern high temperature high pressure piping systems.

The result of overlooking the factors discussed above is often to subject the piping to sizeable stresses which were not considered in the design of the piping involved. Moreover, the stresses produced by these uncompensated factors are additive, in many cases, along a run of horizontal piping, producing large unbalanced forces in the piping assembly as a whole.

In many cases, I have found that the result of one or more of these factors in a spring support is to produce a type of phase shift between the moment curve of the spring force and the curve of the actual effective load moment arm, causing the vertical component of the load supporting force to be too large over a portion of the travel of the support arm and too small over the remainder of the travel. By adjusting the angular relationship between the supporting arm and the spring arm, these two curves are brought more nearly into coincidence over a large and favorable portion of each curve, and an additional correction force may then be provided over the remainder of the curves to provide a much more nearly constant support action than in prior spring support hangers.

Accordingly, it is an object of my invention to provide a spring support wherein the phase relationship of the spring lever moment curve and the curve of the effective load moment arm can be set or adjustable to compensate for the arcing factor or the radius and amplitude of the horizontal travel of the load relative to the support-arm load pivot or all of them.

In certain instances I have found that the disclosed supports can be adjusted so that the arcing factor effect compensates for the horizontal travel of the load, resulting in a more nearly constant supporting force for the piping and substantially eliminating horizontal forces in the pipes.

An advantage of the present invention over supports using rollers to accommodate horizontal load travel is that where a number of supports are used the horizontal forces developed because of friction and sticking of the rollers are necessarily in the same direction. These horizontal forces thus cumulate along the length of the pipe run, resulting in large troublesome horizontal forces at the end of the run. With the present invention adjacent pairs of spring supports can be arranged to face in opposite directions so that any slight residual horizontal components automatically cancel out.

In other cases where the horizontal movement of the load is negligible but a large vertical travel exists, these supports may be adjusted so that the support-arm load pivot is offset from a vertical relationship with the point of connection to the load when the supporting arm is in either an extreme or midposition. Thus, a more nearly constant supporting force is obtained.

Accordingly, other objects of my invention are to provide a spring support which can be adjusted to compensate for deviation in the vertical supporting force due to relative horizontal movement of the load so as to obtain a more nearly constant supporting force.

There have been designs of constant support devices promoted heretofore which have been designed on a theoretical basis disregarding friction and assuming that the frictional hysteresis loop could be minimized by the use of ball, roller or needle bearings. Such roller type bearings in continual rotary operation maintain their efficiency, but when used for relatively static loads over periods of years I have found them to be less reliable in this respect than plain bearings, especially of the knife edge type. Pipe hangers are usually installed in inaccessible places and in various kinds of adverse environment, where they receive little or no maintenance, such that roller type bearings become inefficient. Thus, one of the difficulties with prior spring support design, when applied to the greater loads and travels of today, has been the sizable static friction. When the supported piping begins to move up or down, it develops more and more unbalance until enough unbalanced force is accumulated to overcome the static friction of the heavily loaded pivots of the supporting lever.

The present invention utilizes a pair of supporting springs balanced against each other radially of the lever and balanced angularly against the moment of the load connected to the supporting arm, whereby the spring forces produce a pure couple, or balanced moments, about the pivot with no resulting force on the pivot bearing due to the spring force. Hence, the static friction at the bearing is greatly reduced, and the more satisfactory plain pivot bearings disclosed herein can be used with a narrower hysteresis loop than in prior supports.

Another aspect of the present invention provides a balanced load-supporting force adjustment, so that a support embodying this aspect of the invention can be adjusted to its particular load without producing large unbalanced spring forces on the pivot bearing. The adjustment for changing the load capacity of the support is conveniently located for use in the field. Moreover, a turnbuckle arrangement is made available for simultaneous and balanced adjustment of two springs. An important feature is that the adjustability of the supporting devices described herein and their standardization to utilize different sizes of springs enables a single size support to accommodate a wide range of loads and of movements, both vertical and horizontal, and enables an improved load capacity and travel indicator to be used.

Another object of the present invention is to provide for adjustments readily made in the field, for adapting the supports accurately to the particular conditions which each encounters, including horizontal movements of the load, vertical positions and vertical movements of the load, and arcuate travel of the supporting arm with rise and fall of the load relative to its support point.

A further object of the invention is to provide an indicator arrangement on the outside of the frame of the support which enables simultaneous reading of the capacity adjustment and the vertical position of the support arm. This facilitates the initial adjustment of the support hanger when it is installed and is a great advantage after installation, since an inspector walking on the floor can readily tell by looking up at the scale whether the support arm has changed its operating position, indicating a settling in the framework of the building such as to require readjustment of the support.

A further advantage of the present invention is its small headroom requirements. Thus, with a support embodying the present invention the load can be supported relatively close to the underside of a deck or the bottom flange of a beam, and still have a wide range of available vertical motion for the load.

Another advantage of the balanced spring arrangement is that the over-all width of the spring support is reduced over that of known supports of the same capacity which use two springs side by side. In fact, the widths of the disclosed hangers are usually less than the outside diameters of the supported pipes, making installation of the supports possible in almost any place the pipes run, e.g. between two bulkheads.

Among the objects of the present invention are to provide a balanced spring support which is simple in construction, relatively inexpensive and rugged, which has insignificant static friction, so that the support is quick in response to movements of the load, and which can be adjusted to carry with constant support a wide range of loads having a wide variation in the range of movements and is easy to install and inspect in operation.

Although I shall now give specific examples of my invention as shown in the accompanying drawings and described herein and although I refer herein to certain preferences in construction and arrangement of elements and to certain recommendations, and alternative, it is to be understood that these are not exhaustive or limiting of the invention, but are illustrative of the invention and for the purpose of instructing others in the principles of the invention and the manner of its use, to the end that they may be enabled not only to use it in the particular embodiments shown but to so modify it and adapt it to various needs and conditions of use as to make the invention fully available to the public after the term of this patent has run its full course.

In the drawings:

Figure 1 is a side elevational view partly broken away and partially in longitudinal section of a preferred embodiment of the present invention;

Figure 2 is a cross sectional view taken along the line 2—2 of Figure 1 looking toward the left;

Figure 3 is a side elevation, on enlarged scale, corresponding to Figure 1 but showing the load capacity and support arm travel indicator in a different position from that shown therein;

Figure 4 is a plan section taken along the staggered line 4—4 in Figure 3 looking downwardly and showing further details of the main pivot and lever assembly;

Figure 5 is a vertical cross section taken along the line 5—5 in Figure 6 looking toward the left and showing the operation of the auxiliary booster spring;

Figure 6 is a vertical longitudinal sectional view taken along the line 6—6 of Figure 4 looking upwardly;

Figure 7 is a partially diagrammatic side elevational sectional view of a modified spring support, embodying the present invention, the section being taken along line 7—7 in Figure 11, looking toward the right;

Figure 8 is a cross sectional view taken along the line 8—8 of Figure 7, looking down, and showing one of the compression springs and spring rods;

Figure 9 is a vertical cross sectional view through the spring support and supported pipe, taken along the line 9—9 of Figure 7, looking to the right;

Figure 10a is an enlarged cross sectional view of the load-pivot end of the support arm, taken along the line 10a—10a of Figure 7, looking toward the right;

Figure 10b is an enlarged partial longitudinal sectional view taken along the line 10b—10b in Figure 10a, looking toward the left;

Figure 11 is an enlarged transverse sectional view taken along the line 11—11 of Figure 7, looking downwardly toward the left, to show the adjustable dual spring levers and capacity indication scale;

Figure 12 is a partially diagrammatic side elevational sectional view of another spring support embodying my invention and utilizing tension springs;

Figure 13 is a cross sectional view taken along the line 13—13 in Figure 12, looking to the right, showing the load-pivot end of the support arm;

Figure 14 is a cross sectional view taken along the line 14—14 in Figure 12, looking to the right;

Figure 15a and 15b are force and dimension diagrams for purposes of explanation;

Figure 16 is a graph of forces, moments and moment arms as a function of the position of the support arm of the spring support shown in Figure 7;

Figure 17 is a side elevational view partly broken away and partly in longitudinal section of a further embodiment of the present invention;

Figure 18 is a bottom plan view as seen looking upwardly at the support of Figure 17, with portions being shown in section;

Figure 19 shows the load position indication scale;

Figure 20 is an end elevational view of the support of Figure 17 as seen looking in the direction of the arrow 20 at the left in Figure 17;

Figure 21 is a cross sectional view of the support of Figure 17 taken generally along the line 21—21 in Figure 17;

Figure 22 is a partial sectional view of the main pivot and a modified form of the angular adjustment mechanism between the load-arm pivot and spring-arm pivot, being taken along the line 22—22 in Figure 21;

Figure 23 is a partial view, on enlarged scale, of a portion of the angular adjusting mechanism shown in Figure 22, as seen along the line 23—23 in Figure 22;

Figure 24 is a partial sectional view, on enlarged scale, of the mechanism for adjusting the effective length of the load arm. This view is taken along the centerline of the load arm, as indicated by the line 24—24 in Figure 17;

Figures 25 and 26 show an embodiment of the load-deflection spring characteristic adjustment control and a portion of the spring means, on enlarged scale, and illustrate the operation;

Figures 27 and 28 show further details of the load-deflection spring characteristic adjustment control;

Figure 29 is a plot of spring force as a function of spring deflection for purposes of explanation of the method and operation of the load-deflection adjustment control of Figures 17, and 25-28;

Figure 33 is a partial sectional and end elevational view of another modified form of the angular adjustment mechanism between the load-arm pivot and spring-arm pivot and also of a modified load-capacity adjustment mechanism;

Figure 34 is a partial side elevational view of the mechanism of Figure 33;

Figure 35 is a detail view showing the structure of the threaded stub shafts on the spring arm;

Figure 30:
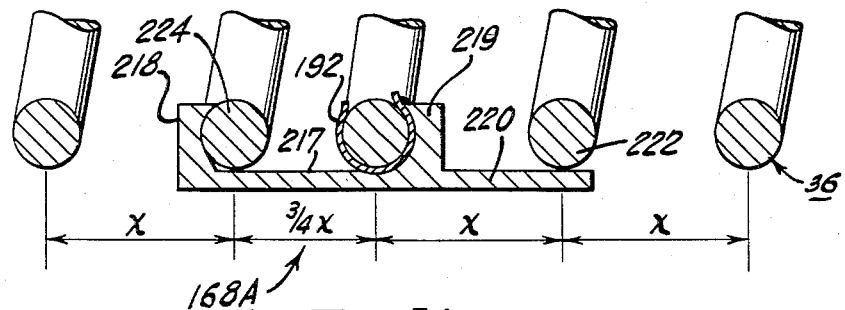
Figures 30 and 31 show another embodiment of the load-deflection spring characteristic adjustment control.

Figures 36a and b are force and dimension diagrams for purposes of further explanation; and Figures 37a and b and 38a and b are graphs of moments and load-supporting force as a function of the position of the support arm of the spring support of Figures 17–28.

The spring support shown in Figures 1–6 is a preferred embodiment and is described in detail below. However, for an easier understanding of many aspects of the present invention, reference is made to Figures 7–11.

As there shown a load, comprising the horizontal section of piping shown at 20, is hung from a spring support device shown generally in Figure 7. The load 20 is held by a pipe clamp 24, pivotally connected at the top by a bolt 26 to a load rod 28, which hangs down from a pivot 29 near the end of a supporting arm 30 in the support device. This arm is pivotally mounted by a main pivot shaft 31 secured by nuts 32 (see Figures 9 and 11) and resting in bearings in the side frame members 33 of the support. As shown, these main bearings are simply formed by polished hard pivot pins operating with generous clearance in Phosphor bronze bushings in the side frame plates 33, thus giving tangential contact like that of a knife edge balance. The whole support may be hung from a beam by means of bolts 35.

The weight of the pipe load 20 pulls down on the support-arm pivot 29 causing the arm 30 to tend to rotate in a counterclockwise direction about main pivot 31. In order to oppose this counterclockwise moment of the load, a substantially pure clockwise couple is produced by lower and upper compression springs 36 acting through pairs of tension rods 38 (see also Figure 8). The inner ends of springs 36 thrust against spring sockets 39 pivotally mounted on the side frames 33 by means of trunnions, shown as bolts 40. The outer ends of these springs bear against spring sockets 41 connected to the tension rods and are free to swing up or down as required by the load movement. Thus, the direction of the pull of the tension rods, pivotally connected to pivots 43 on the ends of the lower and upper spring levers 42 always passes through the axes of their respective trunnions 40.

Connected between pivot 29 and an adjustable clevis bolt 53 (see also Figure 9) secured to top plate 34 and held by an adjustment nut 44 may be an auxiliary booster tension spring 45, the function of which is described more fully below. The top end of the spring is held by a spring plug 46 having an eye 47 pivotally connected to the bolt 53. The lower end of this booster spring (see also Figure 10) is fastened by spring plug 48 having eye 49, shackles 50 and yoke 51 to the pivot bolt 29. This booster spring is adjusted so as to aid in supporting the load when the supporting arm 30 swings below a predetermined adjustable position. It usually is adjusted to begin acting when the arm swings below approximately its mid-range or horizontal position, such as is shown in Figure 7. When the supporting arm 30 rises above the position at which the booster spring takes effect, the yoke, shackle and spring can buckle freely to avoid impeding further upward motion of arm 30.

The precise point from which the booster spring takes effect is determined by adjustment of the clevis bolt 53 and nut 44 relative to plate 34.

The booster spring advantageously is very small relative to the main springs 36 and its total effect only a small fraction of the force of load 20, its purpose being to aid in correcting the deviation in load-supporting force caused by departure of the load rod 28 from a true vertical line of support; but if desired, a part of the load-supporting function can be taken over by the booster as in my Patent No. 2,145,704.

As mentioned in the introduction, the load never acts as a freely suspended body and hence the load rods on the spring supports in use are rarely found in a truly vertical position. This deviation may arise from several factors, and in order to understand the result consider the operation of the support device shown in Figure 7.

The moment about pivot 31 caused by the action of the load 20 pulling down on arm 30 depends upon the relative positions of pivots 29 and 31 and upon the amount by which the pull of the load deviates from the vertical. Generally, the load moment is greatest when pivot 29 is in approximately a horizontal position with respect to pivot 31 and is least when pivot 29 swings farthest above or below pivot 31 because the effective moment arm of the supporting arm is reduced by the greatest amount in these extreme positions.

Similarly, the moment about pivot 31 caused by the springs 36 varies from a maximum when the spring levers 42 are in a predetermined position to minima when they swing furthest in either direction therefrom.

Adjustment of the position of the pivot 29 relative to the levers 42 about the pivot 31 shifts the phase of the load moment curve relative to the spring moment curve (i.e. the relative positions of the maxima). (See also Figures 10a and 10b.) To facilitate such adjustment, the pivot 29 extends through a horizontal hole in an adjustable block 52 fitted freely between the sides of the supporting arm 30. These sides are formed by ends of a pair of Y-shaped members 54 seen edge on in Figures 9 and 11 and held in parallel spaced relationship to form arm 30 by a cross piece 59 welded across their ends. Adjustment bolts 55 extend down through vertical holes 56 in a pair of cross pieces 57 and into threaded holes 58 in the block 52. As shown in Figure 10, the pivot shaft 29 projects out on either side of block 52 through arcuate slots 60 in the sides of supporting arm 30, which are concentric with main pivot 31. Thus, screwing up or unscrewing the bolts 55 raises or lowers the pivot 29 in the slots 60, while maintaining concentricity in arcuate slots 60. To allow for slight longitudinal motion of the block 52 and bolts 55 with the pivot shaft during adjustment, the holes 56 are enlarged in the direction of the length of the arm 30, as seen in Figure 10b. A central vertical flared hole in block 52 receives the ends of the yoke 51 (Figure 10a) and an eye 62 on the upper end of the load rod 28 in position to be connected to the center of pivot shaft 29, and with enough clearance that yoke 51 and load rod 28 can freely swing around pivot 29 independently of each other within the limits of their operation, e.g. approximately 70°. The outer ends of the pivot shaft 29 are threaded, and a pair of washers 64 and nuts 66 hold it in place. These nuts may be tightened against sides 54 when the block 52 has been adjusted.

Where the operating conditions are fully specified and the parts to be supported can all be weighed, the position of pivot shaft 29 can be accurately determined and the adjustment block 52 and associated parts may be omitted, a pair of circular holes being accurately drilled, either during manufacture or at the construction site.

Load rod 28 is provided with a turnbuckle 68 and locknuts 70 to adjust its length.

The analysis of the operation of a constant support spring hanger is set forth in my Patent No. 2,145,704, dated January 31, 1939, and will help to explain my present invention. The following analysis is general and applies to all constant support hangers utilizing a spring acting on one arm of a bell crank lever system to support a load force acting on the other arm. Merely to help in visualizing the operation and to aid in description this analysis is sometimes referred to the device shown in Figure 7. Referring primarily to Figures 7 and 15a of this application:

$k$=the load/deflection ratio, i.e. stiffness factor of the main spring system, e.g. in Figure 7 it is that of each of the main springs 36.

$a$=the distance and direction from the main pivot to either of the spring-anchoring pivots or trunnions; in Figure 15a only the triangle for the upper spring 36 and its lever 42 is labelled, to simplify the diagram.

$b$=the distance between the main pivot and the lever pivot upon which the spring acts; that is, "$b$" is the effective length of the levers, e.g. in Figure 7 it is the effective length of either spring lever 42;

$C$=the angle between $a$—$b$.

$B$=the angle between the vertical and the axis of the supporting arm from its main pivot to its load suspension pivot.

$H$=the relaxed length of the main spring system and its connections, i.e. the distance which would be measured between the spring-anchoring pivot and the lever pivot upon which the spring acts if the lever pivot shaft were removed from the spring lever and the spring allowed to expand or contract to its fully relaxed position; that is, in Figure 7, if either pivot shaft 43 were released from its lever 42. When $H=0$, the distance between either of the spring-anchoring pivots 40 and the corresponding lever spring pivots 43 is always equal to the amount of deflection of the spring.

As shown in my Patent No. 2,145,704, the formula for the moment $m_s$ of the spring system acting to turn the spring lever about the main pivot; e.g. the moment of either of the springs 36 in turning its lever 40 about main pivot 31 can be expressed in the above defined terms, as follows, where the subscript "$s$" denotes the spring moment.

(1) $\quad m_s = kab \sin C \left( 1 - \dfrac{H}{\sqrt{a^2+b^2-2ab \cos C}} \right)$ In the balanced spring system of Figure 7, the total moment $M_s$ of the two springs is effectively twice this amount, slight variations in the stiffness factors "$k$" being compensated for by opposite adjustments in lever lengths "$b$."

(2) $\quad M_s = 2m_s = Kab \sin C \left( 1 - \dfrac{H}{\sqrt{a^2+b^2-2ab \cos C}} \right)$ where $K=2k$, the effective load/deflection ratio, or stiffness factor, of the two springs 36 acting together.

The formula for the spring-moment curve, given above in (2), reduces to the following pure sine curve when $H=0$:

(3) $\quad\quad M_s = Kab \sin C$

Desired values of $H$ are attained in my present structure by adjusting the effective length of the tension rods 38 by means of the nuts 72. In the following description it is assumed that $H$ has been adjusted to equal zero so that simplified Equations 3 above and 4 below apply; but the invention is not limited to such adjustment. The effect of a finite value of $H$ is shown by comparison, in Figure 5 of my Patent No. 1,937,135, of curve "$a$," which is a pure sine curve occurring when the relaxed length "$H$" is made equal to zero, with curve "$b$," which is distorted by the value of "$H$" being substantially greater than 0, so that the spring remains relaxed until the bell crank lever reaches a substantial angle beyond the in-line position (0°). Obviously an infinite number of such curves is available.

In Figure 16 the curve 80 represents the moment curve, when $H=0$, of a spring system acting on its lever arm. It is a pure sine curve, and has a maximum when C equals 90°. The solid line curve 80 is obtained by plotting normalized values of the spring moment as a function of the angle C as explained below. The absolute values at each point along such a spring moment curve depend upon the capacity of the support device being considered, and hence to make the curves general in applicability they are shown as normalized curves, i.e. in terms of unity. With reference to the support device of Figure 7, in order to obtain a normalized curve, both sides of Equation 3 are multiplied by the factorial constant $$\frac{1}{Kab}$$

Thus the normalized curve 80 is a plot of:

(4) $$\frac{M_s}{Kab} = \sin C$$

The same curve would result from plotting in terms of angle B normalized values of the moment of the load if freely suspended from the supporting arm.

The abscissae for all curves in Figure 16 are in degrees of angle, i.e. either angle B or angle C, depending upon whether the load-supporting arm or spring lever is involved with the particular curve under consideration. The ordinates of all of these curves are normalized so that they can be plotted in terms of unity, for purposes of comparison. Curve 80 is a normalized moment curve. Curve 82 is a normalized curve of the actual effective moment arm in exerting a vertical supporting force on the load. Comparisons should be made between the values of the "Sine of angle" represented by the true sine curve 80 and the value found on the moment or moment arm curve under consideration. Curves 86, 88 and 90 are curves of force normalized by dividing by the weight of the load. Comparison should be made between the desired supporting force (which is unity on these curves) and the value found on the curve under consideration. Thus the relative values on the force curves can be understood to mean "Fraction of desired supporting force."

In order further to consider the operation of this support, the following definitions should be kept in mind:

$L=$ the effective length of the supporting arm 30, that is, the distance between pivots 29 and 31.

$Z=$ the load rod length, that is, the distance between pivots 29 and 26.

$W=$ the actual load weight to be supported.

$E_w=$ the vertical component of the supporting force.

$E=$ the actual tension exerted on the load rod.

$\theta=$ the angle between the vertical and the actual line of pull on the load.

The load moment may be expressed as follows, where the pull of the load is vertical. The subscript W denotes that the weight of the load is involved:

(5) $$M_w = WL \sin B$$

This formula may be normalized by multiplying both sides by $1/WL$, giving:

(6) $$M_w/WL = \sin B$$

This pure sine curve may also be represented by the solid line curve 80 shown in Figure 16 considered as plotted in terms of angle B.

In the curve 80 it is assumed that the pipe load rod 28 was free always to hang plumb from the supporting arm load pivot 29, and thus a truly constant-pull supporting action could be obtained. This freely hanging condition is seldom obtained in actual piping installations.

Assuming first for sake of simplicity an installation in which the piping has substantially no horizontal movement but does move vertically up and down over a considerable distance with changes in temperatures in the pipes. The supporting arm 30, when following such movement, must carry pivot 29 along an arc (Figure 15a), e.g. from $B=55°$ or 60° through its mid-position to $B=120°$ or 125°. In Figure 15a it is further assumed that the operating range of the bell crank assembly 30, 42 is such that the supporting arm 30 swings about the same distance above the horizontal as it does below the horizontal. This condition gives the maximum vertical component of travel of the supporting arm load pivot 29 for the least horizontal component. Nevertheless, if with pivot 29 in its horizontal midposition the load rod hangs vertically then the load rod becomes canted to an angle $\theta$ (with the vertical) when the pivot 29 is either above or below the horizontal.

This canting of the load rod, which heretofore has been overlooked or treated as insignificant, I have found to have a startling effect upon the supporting force actually exerted on the load. Actually it is as significant as other factors which have caused much concern and have been the object of a number of patents.

An analysis shows that when the piping is in its top position, the actual moment arm of the load-supporting arm 30 (shown by the perpendicular distance from the main pivot 31 to a point 92 on the line between pivots 26 and 29) is greater than it would be in the case of the horizontal distance from pivot 31 to a point 94 on a vertical through pivot 29, which is the actual moment arm for a freely hanging load. Because of the canting of the load rod 28 to an angle $\theta$, the actual effective moment arm of the load-supporting arm 30 in providing a vertical force to the load is the actual moment arm multiplied by $\cos \theta$, for the vertical component of the supporting force $E_w$ is less than the tensile force E in the load rod, as shown in Figure 15b.

In terms of operation, this means that the moment of the load is not accurately balanced against the spring moment. On Figure 16 this is shown by the curve 82, representing the actual effective moment arm of the load, departing from curve 80 representing the spring moment. The normalized actual supporting force is plotted on Figure 16 as curve 86, which is obtained by dividing the spring moment curve 80 by the actual effective load moment arm curve 82, giving the actual supporting force in terms of unity.

The actual supporting force $E_w$ represented by the dash and double dot curve 86 is too low (i.e. less than 1.00) when angle B is less than 90°.

The reverse is true when angle B is greater than 90°. For example, the actual moment arm of the load lever when in its bottom position is the perpendicular distance from pivot 31 to a point 87 on the load rod's line of action through the bottom positions of pivots 26 and 29. This is less than it would be if the load were freely hanging, which is the distance from pivot 31 to the point 94. Thus, the load moment arm curve 82 is too small relative to the spring moment curve 80 when angle B is greater than 90°, and the supporting force $E_w$ is too large.

The desired value for the vertical supporting force is:

(7) $$E_w = W \text{ (desired condition)}$$

The actual vertical supporting force $E_w$ is a function of the actual tension E, exerted along the load rod, and the angle $\theta$ by which the load rod deviates from the vertical:

(8) $$E_w = E \cos \theta$$

I. When B is less than 90°:

The load rod tensile force E times the actual moment arm of the supporting arm length L must equal the moment of the springs $M_s$:

(9) $$EL \cos[90° - (B+\theta)] = M_s$$

This can be rewritten as:

(10) $$E = \frac{M_s}{L \sin(B+\theta)}$$

Substituting this in Equation 8:

(11) $$E_w = \frac{M_s \cos \theta}{L \sin (B+\theta)}$$

Using trigonometric relationships:

(12) $$E_w = \frac{M_s \cos \theta}{L (\sin B \cos \theta + \cos B \sin \theta)}$$
$$= \frac{M_s}{L (\sin B + \cos B \tan \theta)}$$

From Figure 15a it is seen that tan θ can be expressed in terms of known factors as follows:

(13) $$\tan \theta = \frac{L - L \sin B}{\sqrt{Z^2 - (L - L \sin B)^2}}$$

Substituting in Equation 12:

(14) $$E_w = \frac{M_s}{L \sin B + \frac{\cos B (L - L \sin B)}{\sqrt{Z^2 - (L - L \sin B)^2}}}$$

Although the desired condition is expresed by Equation 7, $E_w = W$, I have found that when this is applied to Equation 5 it does not give directly the result desired. I have found it necessary to modify the moment arm, $L \sin B$, by an "arcing correction factor":

$$\frac{\cos B (L - L \sin B)}{\sqrt{Z^2 - (L - L \sin B)^2}}$$

This "arcing correction factor" is the amount by which the actual effective load moment arm is too large when angle B is less than 90°, under the conditions specified.

II. When B is greater than 90°:

(15) $$EL \cos [90° - (B - \theta)] = M_s$$

The only difference between this equation and Equation 9 is in the sign of the angle θ.

Carrying the analysis through in steps parallel to those shown by Equations 10 through 14 above, the following equation for $E_w$ results:

(16) $$E_w = \frac{M_s}{L \sin B - \frac{\cos B (L - L \sin B)}{\sqrt{Z^2 - (L - L \sin B)^2}}}$$

In this case, when angle B is greater than 90° the "arcing correction factor" has a negative sign, showing that this factor is the amount by which the actual moment arm is too small.

To illustrate the serious effect which the deviation can have, if uncorrected, assume operating conditions under which the supporting arm 30 is swinging only 25° above and below the horizontal (which is less than often occurs) and assume that the load rod is the same length L as the supporting arm 30 (which is not unusual). Then the deviation of the supporting force (above and below the desired value) is plus and minus 4%, the total variation in the supporting force being 8%, as calculated from Formulas 14 and 16, which may be a significant amount seriously affecting the factor of safety in a critical piping system. If horizontal travel of the load occurs, this deviation may be greater.

If the supporting arm were swinging 35° above and below the horizontal, the total variation in the supporting force obviously would be to an extent that raises a serious question whether devices so operating may be designated "constant-support," even when $H = 0$.

In order to correct for this arcing deviation factor, an adjustment (called "φ-shift") is made in the angular relationship of the load suspension pivot 29 to the spring pivots 43 about main pivot 31, which also changes angle B by the same number of degrees. In the case under discussion, the bolts 55 (Figures 10a and 10b) are tightened so as to reduce the angle B, for any given value of the angle C, by an amount approximately equal to the maximum value of the deviation angle θ for the installation under consideration. The result of this is shown graphically on Figure 16, namely, the shifting of the actual effective moment arm curve 82 bodily to the right, by an amount equal to this maximum value of θ; so that it becomes curve 84. For other cases, as where the load rod is not the same length as the supporting arm, or where the load has horizontal components of motion, then the "φ-shift" used may be more or less than the maximum deviation angle θ of the line of pull of the load from the vertical.

This φ-shifted curve 84 follows quite close to the true sine curve 80, for values of B less than 90°. By dividing the values along curve 80 by the respective values along curve 84, the resulting curve 88 shows the vertical supporting force on the load after the φ-shift of pivot 29. Curve 88 is very near to unity for all values of B less than 90° and within the operating range of the hanger.

For values of B larger than 90° the φ-shift curve 88 is continuously above the true sine curve 80 so that the vertical supporting force curve 88 on the load is too small above 90°, sloping downwardly to the right along almost a straight line path. In order to compensate for any droop of the right side of curve 88, which occurs particularly when there is a horizontal pivot movement of the pipe clamp pivot, a booster spring 45 is provided. This spring provides a straight line increase of force as shown by curve 91 for spring $S_2$ but acts only when angle B is in the upper quadrant (in the right side of the Figure 16 graph). The slope of curve 91 depends upon the stiffness factor, i.e. load/deflection ratio of the spring 45. The resultant curve 90, representing the actual supporting force of the device after φ-shift and with the booster spring, is very near to unity.

If instead of positioning the hanger with pivot 29 vertically above pivot 26 when arm 30 is horizontal, it is positioned beneath the position of pivot 29 when one quarter way up or down from the limits of its operation range, the deviation will be one half to the right and one half to the left. With such an arrangement the curve 82 would be brought closer to curve 80 except in the vicinity of 90°, where it would be spaced below it. Somewhere near to the one-quarter and three-quarter possition (which in the case of a limit of 25° above and below horizontal are at 77.5° and 102.5°) these curves would cross. This expedient is sufficient for small deviations but larger deviations require compensation which can best be achieved by the φ-shift and booster spring described above.

Also, it is to be noted that where curve 82 is below curve 80 in the mid range, there may be an advantage in changing the spring characteristic away from an $H = 0$ condition to obtain additional compensation.

Horizontal components of movement of the load give a deviation analogous to the horizontal component of the arc of the supporting arm; and my invention may be utilized to correct that deviation and provide a truly constant support. Assume that the pipe-clamp pivot 26, with the pipes cold, hangs at a given position and that as the pipes come up to operating temperature the pivot 26 rises an amount within the range of the device and moves to the right a distance equal to about ½ this vertical travel. The support 22 is then advantageously arranged so that when the piping is heated to bring clamp pivot 26 to mid-height, the pivot 29 is in mid-position directly above the clamp pivot 26. As the pipe cools down, pivot 26 moves down and toward the left, while at the same time the pivot 29 moves in the opposite direction because of its arcuate path. The result is to produce an arcing factor effect which is about twice that of a purely vertically moving load as was analyzed.

As the pipes warm up from the temperature of mid-position, pivot 26 moves up and to the right while pivot 29 also moves up and to the right. Thus, above mid-position the load acts more or less as a freely hanging load and produces a true sine moment, i.e. the left half of curve 82 would, under such circumstances, substantially coincide with curve 80.

If the vertical movements of the load can be accommodated mostly by the swing of the supporting arm in the range where its horizontal component thus compensates for horizontal movement of the load, no other "arcing correction factor" may be needed; and in practice the arm may swing substantially beyond that range. Where greater amplitude of movements are encountered, it is more satisfactory to use the compensation with booster spring as set forth above.

This compensation for horizontal movement of the load may be made by arranging the hanger so that the horizontal component of the swing of its supporting arm is in the same direction as the horizontal movement of the load above mid-position, i.e. for values of B less than 90°, and then making an adjustment of bolts 72 to bring the left-hand portion of curves 82 and 80 as close together as possible, the right half of curve 82 can then be corrected by a booster spring in the manner described above. A booster spring of above more than customary stiffness would be used because the arcing factor effect is increased by the horizontal component of load travel, which, in this example, is opposite to the horizontal component of swing of the supporting arm when it is below mid-position. Thus, a constant pull is provided to a load with both vertical and horizontal components of motion. If the horizontal component of motion is in the opposite direction, the support is hung in reversed position and the same procedure used. If the amount of horizontal motion is less, then the required amount of $\phi$-shift and booster spring action is correspondingly reduced or the need for it eliminated, as disclosed above.

Considering further the operation and structure of the spring support shown in Figures 7 through 11, the two oppositely acting springs 36 connected to opposite ends of the spring levers 42 produce a pure couple so that the force of the main springs 36 is not imposed on pivot 31. This will be understood by considering the conditions of static equilibrium as applied to the lever system 30, shown in Figure 7.

These conditions are (1) that the sum of the vertical components $F_v$ of the forces acting on the system must be zero, (2) that the sum of the horizontal components $F_h$ of the forces acting on the system must be zero, and (3) that the sum of the moments M about main pivot 31 must be zero.

(1) $F_v = 0$
(2) $F_h = 0$
(3) $M = 0$

From conditions of symmetry it is seen that the vertical and horizontal components of the forces produced by the springs 36 are equal and opposite and cancel out, leaving only a pure clockwise moment acting about the pivot 31, acting to counterbalance the counterclockwise moment of the load pulling on the arm 30. The downward force of the load only is held in equilibrium by the bearings of the main pivot 31, and thus the loading on the pivot 31 is always substantially vertical.

By using single springs projecting from opposite ends of the hanger, its width is held to a minimum, an advantage in installing because the hanger is thus usually narrower than the pipe diameter.

Advantageously, a balanced, axial arrangement is provided for adjustment of capacity to accommodate tolerance variations and a range of load sizes and operating conditions. The effective length of spring levers 42 can be adjusted, simultaneously or individually. A scale, shown, for example, at 95 in Figure 7 and pointers 96 indicate the adjusted positions. The adjustment is made by rotating a pair of disks 98 to screw eye bolts 100 out or in along the length of the levers 42, thus moving the spring pivot shafts 43 respectively, toward or away from the ends of levers 42. Each of these pivot shafts extends through the eye of one eye bolt 100 and the eyes on the ends of a pair of rods 38. The ends of each shaft 43 extend through slots 104 (Figures 7 and 11) in the sides of spring levers 42 parallel to the axis of the levers to guide the adjustment of the shafts 43. The side members 54 are tied together at the ends of levers 42 by cross braces 102.

One end of each pivot shaft 43 is headed and the other end is held by a fastener 106, shown here as a pinned washer secured by a taper pin 108. Upper shaft 43 and its washer fit with clearance inside the side frames 33.

Each of the adjusting nuts 98 is held between the sides 54 of the levers and bears against a block 110 at the hub of the lever system 42, 30 and a cross strap 112. This hub block has a transverse hole fitted to the main pivot shaft 31 and a longitudinal hole 112 in which the inner ends of the turnbuckle eye bolts 100 are received. Pointers 96 project from the inner ends of bolts 100 out through slot 116 in block 110 and over scale 95.

There are slight tolerance variations in the stiffness of springs, and when the support is assembled the adjustment disks 98 may be individually turned to shorten one of the spring levers 42 relative to the other to compensate for the stiffer spring so as to produce a substantially pure couple about pivot 31. This position may be marked on scale 95. Thereafter, if it is necessary to adjust the spring lever arms for a lighter or heavier load, the adjusting nuts 98 are turned simultaneously in the manner of a turnbuckle by means of a two-pronged fork or spanner wrench with prongs spaced to fit into corresponding pairs of holes 118 in the edges of the nuts.

The preferred spring support embodying my invention is shown in Figures 1–6 and is similar in many respects to the support shown in Figures 7–11, and parts performing corresponding functions are designated by like numbers. There are several important features in this embodiment which differ from the other.

As shown in Figures 1, 2, and 3 a combined capacity and travel indicator scale 120 is connected to an extending end portion of the upper pivot 43 and arranged to be read against an arc 122 and graduations scribed on the outer face of one frame member 33 and concentric with main pivot 31. An arcuate window 124 in this frame provides clearance for the end of shaft 43 as it moves due to travel of the load. The position of the load, i.e. "High," "Mid," or "Low" is determined by comparing the scale with the graduations and three radial lines 126 scribed perpendicular to arc line 122. In Figure 1, the load is in top position with the upper lever 42 stopped against one of the three angle braces 127 to which support rods 35 are attached. In Figure 3, the load is at mid-position with the right scale edge of the scale 120 at the "Mid" line.

Simultaneously with the load position the adjustment of the support is read by comparing the scale markings 123 with reference line 122. Mid-scale, shown by arrow 128, is considered "Rated capacity" and the cardinal scale markings on the inner end of the scale represent, respectively, 5%, 10%, 15% and 20% increase over rated capacity and those on the outer end a corresponding decrease. In Figure 3 the setting reads about 18% increase.

An advantage of this support is that its actual capacity can be varied by changing the inner and outer coaxial springs 36 and 36'. Both are shown but either or both may be used for different sizes of load. It is possible to omit one of the springs on each side or to use lighter springs on each side, and where the loads are lighter, so that the static friction is less important, it is possible to use only one or both springs acting on one lever and to omit the lever and spring assembly on the other side of the main pivot. Single spring rod clevis bolts 38 are used instead of the pair of rods shown in Figure 8.

The "Rated capacity" of each support is determined by calculation or testing and is stamped on the scale plate 120 or on the frame.

The adjustment of the capacity is made by a hexagonal turnbuckle sleeve 130 (see also Figure 4), which receives the inner ends of both spring pivot adjusting eye bolts 100 whose eyes are straddled on shafts 42 by the eyes of the spring clevis rods 38 (see Figure 2). The turnbuckle sleeve 130 is mounted in the center of the compound bell crank lever 30, 42 between a pair of bearings 132 for bolts 100 which are held in place by retainers 134 and screws 136. There is no hub block between the center portions of the two side bars 138 forming levers 42, allowing clearance for the turnbuckle. Two end cross braces 140 and the bearings 132 hold these lever bars 138 squarely together, as seen best in Figure 2.

The supporting arm 30 is formed by two wide spaced flat elements 140, having a foot shape as seen in profile in Figure 1. These elements 140 are spaced more widely than the lever bars 138 (see Figure 4). Their toe portions are welded to the respective outsides of bars 138 by blocks 142 and their heel portions are welded to these bars by web pieces 144. The width of the arms 30 in the plane of their rotation provides for adjustability of the angular relationship of the pivots 29, 31, and 43 by permitting drilling of the hole for the pivot 29 in the position desired to provide the desired $\phi$-shift correction for a particular installation.

Trunnions 31 formed by bolts 146 mount the lever assembly between frame sides 33, the elements 140 having Phosphor bronze bearing inserts freely turning on the bolts 146 which are mounted through collars 148 fixed to the side frames 33.

The outer ends of supporting-arm elements 140 are bracketed by a cross member 150, and dual load rod clevises 152 are pivoted to each of these ends by pin-secured shafts 29.

As seen in Figure 2, an advantage of the dual load rods 28 is greater stability for the load and a reduction in headroom requirement, for the load connection pivots 26 are spaced toward the sides of the pipe.

The booster spring arrangement also differs from that in Figures 7–11. As shown in Figures 5 and 6, the spring 45 is fastened by an upper spring plug 46 to a lip 154 extending between side frames 33. The lower spring plug 48 supports a cross piece 156 with adjustment bolts 158 depending from each end through guide holes in a pair of tongues 160 (see Figure 4) secured to a cross piece 162 (Figure 6) between frame sides 33.

A pair of forks 164 project out and down from the supporting-arm cross member 150 (Figure 5) with their bifurcated ends spaced to straddle the booster spring adjustment bolts 158 and engage square nuts 166 thereon backed up by hexagonal lock nuts 168. As seen in Figure 1, with supporting arm 30 in the high position, forks 164 are clear of bolts 158. As seen in Figure 3, in midposition, the forks engage the tops of the square nuts, and as the load travels down toward low position, booster spring 45 is stretched. In extreme low position, arm 30 is stopped by locknuts 168 engaging tongues 160.

To indicate the position at which the booster spring comes into action by engagement of the forks and square nuts, a pair of scales 170 project down from the ends of booster cross piece 156, seen edge on in Figure 5 and broadside in Figure 3. These scales are marked on the inside 20–10–0–10–20 and are arranged so that the forks just touch the top surface of the square nut when the supporting arm is in mid-position and the support is adjusted for rated capacity. When adjusted to an increased capacity, say 8%, the square nuts are turned up until their top surfaces are aligned with the 8 mark on scales 170 so that the booster spring comes into action just a little before the mid-position, and vice versa when adjusted for less than rated capacity. The reading on scales 170 in general should be made to agree with the reading on scale 120.

The formulas, curves and diagrams discussed above apply to this support in the same manner as to the one shown in Figures 7–11. It may be noted that the spring anchoring pivots 40 are located in a more clockwise position around main pivot 31 with respect to the spring levers 42 than in Figure 7. This causes angle C to be larger than angle B and displaces the maximum of the spring moment curve from the 90° position of the load arm 30. However, in this case the adjusting nuts 72 and relaxed length of springs 36 and 36' are arranged so that H is not equal to zero and the resulting modification in the spring moment curve acts to compensate for the phase displacement of the spring moment curve relative to the load moment curve. Thus, this relocation of the angular position of the spring-anchoring pivots with respect to the main pivot has a $\phi$-shift effect like adjustment of the relative angular position of pivots 29 and 43 with respect to the main pivot. A radial adjustment of the spring anchoring pivots 40 toward and away from the main pivot, as shown in Figure 1 of my Patent No. 1,937,135 is not such a $\phi$-shift adjustment, but only changes the value of H as shown by the curves in Figure 5 thereof. The concepts of $\phi$-shift and H change are widely different as is apparent from the above analysis.

In Figures 12, 13, and 14 is shown a modified form of constant-pull spring support, which is similar to the supports described and parts performing functions corresponding thereto are designated by like numbers. The overall length of this support is greatly reduced by the use of tension springs 36 mounted to extend through the spring lever arms 42 into trunnion-mounted spring sockets 39.

The load, not shown in these figures, is supported by a load rod 28 from a yoke 174 whose arms are spaced apart enough to clear spring 36 and its mounting and are hung by trunnions 29 from the end of a load-supporting arm 30.

For ease of fabrication the lever system including the arm 30 and the two spring levers 42 is of welded construction, made from sheet steel plate or strip. Across the free end of the supporting arm near the load pivot 29 is welded a spacer 176 and a pair of main pivot trunnions 31 are formed on the outside of the hub end of the load arm 30. The spring levers 42 are formed by two spaced bars 138, one of which is welded at an angle across the inside of the hub end of each of the two spaced straight elements 140 forming the load arm 30. A second spacer 178 is welded between the hub ends of load-arm elements 140 adjacent an edge of each of the spring lever bars to reinforce the welded connection.

Among the advantages of this simple welded construction is that the entire space within the lever system 30, 42 is clear to receive the tension springs 36 and their mounting caps and trunnions. Spring plugs secure the ends of the springs within the pivoted cylinders. By placing these springs substantially entirely within the length of the side frame members 33 the length of the support is reduced, which combined with its low overhead requirement makes it well suited for use in confined spaces.

Although tension springs are used in this support instead of the compression springs used in the other supports, the operation of the two supports is similar, and therefore the formulas and curves discussed above also apply to this support. The definition of H is exactly the same as before, being the distance between either of the spring-anchoring pivots 40 and the corresponding lever spring pivots 43 if the springs were allowed fully to relax.

The diagrams of Figures 15a and 15b apply to this support, and thus, where desired, a $\phi$-shift arcing correction can be built into the support, for example, by drilling the bearing holes for the load rod yoke pivots 29 at positions on the load lever according to the specifications of the installation. Alternatively, the pivots 29 may be adjustable in position, for example, by a sliding block between elements 140 as used in Figures 10a and 10b, to enable the φ-shift correction adjustment to be made by adjustable screws or bolts, in accordance with the disclosure herein.

In the remaining Figures 17 and beyond of the drawings are shown constant support hangers further embodying my invention and which are preferred for use in supporting somewhat smaller loads than the balanced spring moment support shown in Figures 1–6. These further embodiments provide for a small headroom requirement and yet provide a wide range in load capacity adjustment.

Advantageously, the phase shift or so-called φ-shift for effecting the arcing correction is achieved by changing the angle at the main pivot between the load arm pivot and the spring arm pivot. This φ-shift in angle is obtained conveniently herein by adjusting the load arm angularly with respect to the spring arm.

A φ-shift angle scale is provided on the side frame of the support which enables the operator readily to adjust the phase shift and to read the adjusted value with great precision. When adjusting the phase shift angle φ, the spring arm is brought up against a fixed stop in the hanger by the force of the spring and then the desired phase shift adjustment is made and is read directly from the scale during adjustment or later on as desired.

Other advantages of these embodiments of my invention result from the fact that an adjustable control is provided for changing the load-deflection characteristic of the spring over a portion of the travel. This load-deflection control enables the main spring to be used for providing a change in slope, for example, a boost in its load-deflection curve without the use of any auxiliary spring. Thus, this adjustable load-deflection-characteristic control eliminates the requirement for the use of any auxiliary (or so-called booster) spring while yet providing the highly desirable constant-support action under many conditions of operation such as were obtained prior to this invention by the use of one or more auxiliary (booster) springs. This adjustable spring characteristic control operates at some predetermined point in load travel, for example, such as near the mid-position. At this predetermined point it reduces (or increases) the number of "live" convolutions of a main spring so as to cause a proportionately greater (or lesser) load-deflection rate for this spring during movement beyond the predetermined point.

Thus, during movement beyond this predetermined point, the controlled spring is adjusted to act "stiffer" (or "softer") in operation. In one illustrative embodiment of my invention described herein, the load-deflection control provides a "booster" type of characteristic while eliminating the use of a booster spring. In another illustrative embodiment of my invention described herein, the load-deflection control provides a reduction in the slope of the load-deflection characteristic beyond a predetermined point.

Among the further advantages of the embodiments of my invention shown in the remaining figures of the drawings are those resulting from the fact that two load capacity adjustments are provided. The spring arm pivot is adjustable in position along a guideway toward and away from the main pivot for the purpose of adjusting the load capacity of the hanger. This position of the spring pivot along its arm is readily adjusted by swinging the lever about the main pivot to its uppermost position wherein an opening in the frame conveniently provides access to the adjusting mechanism.

In addition to this first load-capacity adjustment which is made at the spring-arm pivot, there is a second adjustment. The extent of the total travel (i.e. from low position of the load arm pivot to its high position), and also the load capacity, is adjustable by adjusting the positioning of the load-arm pivot along substantially the full length of the load arm. In these illustrative embodiments of my support, this adjustment of the position of the load-arm pivot provides accommodation for a wide range of differences in the extent of total travel of the supported loads, as are encountered when the supports are installed in different situations. Thus, these improved supports are more widely applicable. The load arm has a longitudinal slot extending along its full length, and a slide carrying the load arm pivot is adjusted along the slot to any desired position and then is firmly clamped in place and held fixed by interengaging serrated surfaces.

Advantageously, a scale is also provided which extends horizontally along the top of the side frame of the support housing in a position generally above the load arm for locating the position of the "load line" with respect to the arcuate path of the load arm pivot. The "load line" is a vertical line passing through the load clamp pivot, i.e. the point down below at which the load-supporting rod joins the load when the piping is cold.

The remaining illustrative embodiments of my invention are rugged in construction and are easy and economical to assemble and place in use. In these remaining supports, parts performing functions corresponding to those of the hangers as shown in Figures 1 through 16 have corresponding reference numerals. These supports include a combined frame and housing having a generally inverted U-shape as seen in end elevation and including a pair of identical side frame members 33. These side frame members include a rectangular access opening 37 providing access for the load capacity adjustment, as explained further below. These side frame members are welded along their top edges to a horizontal mounting plate 34 forming the top of the housing. The side frame members 33 taper inwardly and downwardly from opposite ends of the top plate 34 to a rounded vertex 19 forming the lowermost point of the frame.

In order to accommodate load movement, the movable lever is pivoted on a fixed main pivot shaft 31 which has a center portion of enlarged diameter spanning between the two sides of the frame. This shaft 31 has threaded end portions of reduced diameter projecting out through holes in the side frame members near to and concentric with the rounded vertices 19. A pair of nuts 32 are screwed onto opposite ends of the main pivot and are tack welded in place, rigidly bracing the side frame members by holding them positioned against the spacing shoulders of the main pivot shaft.

Advantageously, the spring arm 42 of the lever is simple in construction and includes a pair of almost identical rectangular plates 138 which are rounded at their lower ends on approximately the same radius as the vertex 19. These plates are welded along their top ends to a rectangular spacer plate 102. A tubular spacer 47 spans between the lower rounded end portions of the two side plates 45 and projects out through holes slightly beyond the outer surfaces of the two sides of the spring arm. This tubular spacer has its ends welded to the sides and encloses two cylindrical sleeve bearings 49 (please see Figure 21) riding on the main pivot axis 31. In this way the sides of the lever are rigidly braced top and bottom, forming a rugged integral unit.

*Further methods and apparatus for making φ-shift adjustments*

In the foregoing description methods and apparatus for making φ-shift adjustments are described. Further methods and apparatus are described hereinafter.

In order to enable adjustment of the angle at the main pivot 31 between the spring arm pivot 43 and the load supporting pivot 29, an abutment is provided by a sector-shaped spacer 151 (please see Figures 22 and 23) extending between the side plates 45 at their rounded ends. A phase adjusting (φ-shift) screw 153 thrusts against this abutment 151 and adjusts the angle between the load arm 30 and spring arm 42 as explained in detail further below. As shown most clearly in Figures 22 and 23, the screw 153 is threaded through a transverse brace 155 extending between the two bifurcated side plates 140 which form the two sides of the load arm 30. This brace is welded in place and includes a cylindrically curved portion 59 serving to reinforce the side plates 140 near the main pivot.

For purposes of accommodating the abutment 151 and of limiting the range of angular adjustment between the load arm and spring arm, a sector-shaped recess 61 is cut in the plates 140 adjacent to the brace 155. The abutment 151 passes through this recess and can be adjusted to any angular position therein by means of the screw 153. A lock nut 63 holds the adjusted position of the screw.

In order to stop the lever and positively to position it in its uppermost position, the top spacer 102 and the upper corners of the spring arm 42 form a shoulder abutting flush against a first cross brace 127 beneath the mounting plate 34 and forming a positioning stop.

A movable load for example, such as piping in a high temperature steam line, is supported generally in a position below the hanger. Customarily, the length of the piping runs parallel with the length of the mounting plate 34 in an arrangement such as is well understood in the art, but in certain cases the length of the piping may be transverse to the length of the hanger. This piping load is supported by a suitable pipe clamp having a load rod pivot point, for example, such as the point 26 indicated in phantom by a dotted circle 26 near the margin and on a vertical load line 74. A load rod 28 extends up from the pivot 26 and is screwed into the lower end of a turnbuckle element 68 which is carried on an eye bolt forming the upper part of the load rod 28 and pivotally mounted on a load pivot pin 29.

The phase adjustment $\phi$-shift is the decrease or increase in the angle between the load arm centerline 69 and the spring arm centerline 105 in accordance with this disclosure to provide the arcing correction, from the predetermined position as established by the Formula 1 dependent upon the value of H.

The phase adjustment ($\phi$-shift) is made by the following procedure. First, the spring lever 42 is allowed to swing up against the stop 127, and then the screw 153 is adjusted while reading the angle $\phi$ on a scale 181. This scale 181 is mounted on one of the side frame members 33 in a position generally above the load arm pivot 29 when the pivot 29 is in its outer position and the load arm is in its uppermost position. An L-shaped indicator 182 projects laterally from the end of the load arm 30 and then upwardly closely adjacent to the face of the scale 181. The tip of this indicator aligns with the graduations 184 on the scale 181, which read from 0° up to 10°. When $\phi$ is zero, as drawn in Figure 17, the angle between the load arm centerline 69 and the centerline of the spring arm 42 in this example is 55°. Loosening the screw 153 allows the angle between the load arm and spring arm to increase to a maximum of 65°, in this example, giving a $\phi$ reading up to 10°.

This scale 181 is precisely positioned with respect to the stop 127. Thus, whenever the spring arm abuts against the stop 127, the $\phi$-shift angle is precisely indicated.

Load-line adjustment methods and apparatus

As mentioned in column 12, lines 34 to 48, I have found advantages in connecting the load rod 28 with the load rod pivot point 26 (i.e. point of connection to the load) such that the support-arm load pivot 29 is offset from a vertical relationship with the point of connection 26 to the load when the supporting arm 30 is in either an extreme or mid-position. I have found additional advantages in further offsetting the load connection pivot 26 horizontally in the direction of the main pivot 31 as indicated in Figures 17 and 36, such that the load connection pivot 26 always remains offset in the same direction from a vertical relationship with respect to the load-arm pivot 29 for all positions of the load arm. In other words, further advantages are provided by apparatus in which the angle $\theta$ of deviation of the load rod 28 from the vertical never reaches or passes through zero.

Another way of describing this structure is in terms of the "load line," which is a vertical line, shown at 74 in Figures 17 and 36 passing through the load connection pivot 26 when the supported load is not in operation, e.g. in the case of piping, when it is cold. As shown in Figures 17 and 36, the load line is offset toward the main pivot 31 by a significant amount from the extreme locations of the load-arm pivot 29, at its high and low positions, that is, the load line is offset from the chord 250 (please see Figure 36) of the arcuate path of the pivot 29.

To show the importance of the structural relationship of the load line 74, attention is directed to Figure 36, which is identical with Figure 15a, except for the offsetting of the load line 74 from the chord 250.

An analysis of Figures 36a and b shows that when the load is in its high position, the actual moment arm of the load-supporting arm 30 (shown by the perpendicular distance from the main pivot 31 to a point 92 on the axis of the load rod 28) is less than it would be in the case of the horizontal distance from main pivot 31 to a point 94 on a vertical through pivot 29, which is the actual moment arm for a freely hanging load.

This is just the opposite from the condition shown in Figure 15a, because the load line 74 is closer to the main pivot 31 than the chord 250 of the arc of the load-arm pivot 29. Figures 36a and b show an optimum structural relationship for many typical installations.

The actual effective moment arm equals this actual moment arm multiplied by cos $\phi$, for the reason explained in column 10, lines 30 to 33. The actual effective moment arm curve is the curve 82 in Figure 38.

In Figure 36a, when the angle B is 90°, the actual moment arm of the load-supporting arm 30 (shown by the perpendicular distance from the main pivot to a point 107 on the axis of the load rod 28) is still less than it would be in the case of a freely hanging load. In Figure 15a, when B is 90° the actual moment arm of the load-supporting arm equals the actual length of the load arm and thus is the same as for a freely hanging load.

In Figure 36, when the angle B increases to values greater than 90°, the actual moment arm of the load-supporting arm gradually increases and at the bottom position becomes equal to the distance from the main pivot 31 to the point 87, which is approximately equal to what it would be in the case of a freely hanging load.

As a result of these structural changes, the following relationships and definitions also are important: $B_{ll}$= the angle which the load-supporting arm would assume if it were swung to a position 109 as shown in Figure 36b in which the pivot 29 would lie on the load line 74. The subscript "ll" indicates that this is the load-line angle of the support arm.

Following steps parallel to those in Equations 9 through 16, but based upon Figures 36a and 36b, then it is seen that these two equations result:

(17) $$\tan \theta = \frac{L \sin B - L \sin B_{ll}}{\sqrt{Z^2 - (L \sin B - L \sin B_{ll})^2}}$$

in which the distance 111 is $L \sin B - L \sin B_{ll}$. And

(18) $$E_w = \frac{M_s}{L(\sin B \pm \cos B \tan \theta)}$$

Then, by rearranging the right side of Equation 18

(18A) $$E_w = \frac{M_s}{L \sin B} \cdot \frac{1}{1 \pm \frac{\tan \theta}{\tan B}}$$

It will be appreciated from this analysis that Equation 17 is a more generalized expression of Equation 13 and reduces to Equation 13 when the position of the load line 74 passes through the mid-arc position of pivot 29, as was shown in Figure 15a so that $B_{11}$ becomes equal to 90°.

The more generalized expression for the arcing correction factor is thus seen to be:

(18B) $\quad \text{A.C.F.} = \pm \dfrac{\cos B(L \sin B - L \sin B_{11})}{\sqrt{Z^2 - (L \sin B - L \sin B_{11})^2}}$ Hence, it is seen that by offsetting the load line so as to make $\theta$ as nearly constant as possible, the vertical supporting force becomes a more nearly sinusoidal function of the angle B, thus more nearly equalled by the spring moment $M_s$.

I prefer to utilize structure placing the load line in a range of distance toward the main pivot from the chord 250 of the arc of the pivot 29 lying between the limits of zero and S, where S is the height of the arc.

In this example of the optimum condition for many typical installations, the load line is offset from the chord 250 through the extreme locations of the load-arm pivot 29 by a distance equal to approximately one-half of the height "S" (please see Figure 36) of the arcuate path of pivot 29.

By having the horizontal offset of the load line 74 equal to $S/2$, an optimum relationship is obtained for most installations. Furthermore, this offset tends to increase the load capacity of the hanger for any given spring means.

The procedure for establishing the load line is to mount the support in the desired position with the load line scale 76 horizontal and then to drop a plumb bob from the desired point along the load line scale 76 down to the inactive load (cold piping). The load connection pivot 26 is located on this line 74.

In the case shown in Figure 17 of a load arm having an effective length of 6 inches and swinging up to an extreme position about 35° above the horizontal, the height "S" of the arc is about 1.1 inches. Thus, the offset $S/2$ is about .55 inch. The scale 76 is graduated in inches, with zero being positioned directly above the axis of the main pivot 31. Under these conditions it is seen that the load line is set to intersect the scale 76 at a reading of:

(19)

$\quad \text{Load line reading} = 6 - \left(S + \dfrac{S}{2}\right) = 6 - 1.65 = 4.35$ This offsetting of the load line toward the main pivot is helpful by itself in obtaining a more nearly constant supporting force in many installations. By combining the offsetting of the load line with $\phi$-shift so as to obtain the optimum phase relationship together with the optimum load-line structure relationship, a still more nearly constant supporting force can be obtained. Also, this specification teaches that adjustment of the load-deflection rate of the spring (e.g., booster effect) and adjustment of the H-value of the spring can be combined with the other adjustments for obtaining the most nearly constant supporting force under all conditions.

The many advantages of this offset of the load line 74 used in conjunction with $\phi$-shift are seen by comparing the plots in Figures 37a and 38a. As shown in Figure 37b, the load line 74 for the plot of Figure 37a passes through the extreme positions of the load arm pivot 29. With this load-line relationship an L value of 14 inches, a load rod length of 25 inches and using an optimum phase shift ($\phi$-shift) of 2.5°, it is found that a kinematic (i.e., neglecting friction) deviation of less than ±0.66% exists over an angular range of B from 65° to 110° (a total angular travel of 45°), providing a total vertical travel of the load of 10¾ inches. This is a very good result compared with the results actually obtained by the prior art, which assumes a freely hanging load.

However, when the load line is offset by $S/2$ toward the main pivot from the extreme positions of the load-arm pivot 29, and using an optimum phase shift of 4.0°, but everything else the same, it is found that a kinematic deviation of less than ±0.66% now exists over an angular range of B from 60° to 114° (a total angular travel of 54°), providing a total vertical travel of the load of 12½ inches, which is even more travel for the same small deviation from exact constancy of supporting force.

*Preferred sequence of adjustments for installation*

The curves in Figure 16 are plotted in terms of normalized values and so the desired result for constant support action is shown as unity, when dividing the spring moment curve 80 by the shifted effective load moment arm 84. From a more general point of view, it will be appreciated that the desired kinematic result is to obtain a constant quotient 88, regardless of whether this lies above or below a horizontal line through unity. In other words, the desired result is to have a constant ratio between ordinate values of corresponding operating points along the spring moment curve 80 and adjusted load arm curve 84.

Then, when this desired kinematic relationship has been obtained, the proper supporting force for the particular load is obtained by using spring means of the requisite stiffness or by changing load capacity in one or both of the ways described above.

Four interrelated adjustment methods and apparatus are provided by the present invention enabling a very nearly constant supporting force to be obtained under any and all conditions of operation. These are:

I. Load line adjustment
II. $\phi$-Shift adjustment
III. Load-deflection rate adjustment in spring means
IV. H-value adjustment The preferred sequence of adjustments for setting up any one of these supports is in the order listed above. First, the load pivot 26 is connected to the load-arm pivot 29 with the load rod 28 at a small angle $\theta$ which remains as nearly constant as possible over the range of travel. Usually, this is found to be with an offset of the load line approximately equal to $S/2$, as shown in Figure 36.

Then the angular relationship about the main pivot 31 between the load-arm pivot 29 and spring-arm pivot 42 is adjusted by means of the $\phi$-shift adjustment to provide the most constant ratio between ordinate values of the curves 80 and 84 on the left side, that is, for values of B less than 90°, as is also described in column 12, lines 11 to 17 and as shown in Figure 16.

In many cases this combination of (I) plus (II) results in a nearly constant supporting force under the conditions of operation. If not, then the right side, that is, for values of B greater than 90°, is further improved by adjusting the load-deflection rate in the spring means, as described hereinafter. As a final correction factor H can be increased by screwing in the nut 72 along the shaft 38.

In adjusting H in these supports disclosed herein, I find it is preferable to utilize only the range from $H=0$ up to a limiting value in Equation 1 or 2 which makes this fraction equal to 0.25:

(19A) $\quad \dfrac{H}{\sqrt{a^2+b^2-2ab \cos C}} = \dfrac{H}{c}$ when angle $C = 90°$.

In other words I find that it is undesirable in these supports disclosed herein to go above a value of 0.25 for $$\dfrac{H}{\sqrt{a^2+b^2}}$$

because of the rather marked distortion in the spring moment curve.

*Apparatus for adjusting the effective length of the load arm*

As seen in Figure 24, the load pivot pin 29 is included in a slide 65 which is adjustable in position along a slot 67 in the side plates 57 of the load arm 30 toward and away from the main pivot 31. A supplemental load pivot pin 29' is advantageously included for use when it is desired to obtain even a greater load capacity by supporting the load quite near the main pivot 31.

In order to accommodate slight lateral movements of the supported load, the eye 62 of the load rod 28 has its opening laterally rounded or flared out so it can roll slightly back or forth, this flaring being most clearly indicated in Figure 24.

In the particular example shown in Figure 17, the angle between the center line 69 of the load arm 30 and the centerline of the spring arm 42 is shown as being 55°.

In this example, the distance 69 between the load arm pivot 29 and the main pivot 31 is called the effective length of the load arm of the lever and is adjustable by moving the slide 65 along the slot 67. This slide includes a pair of side links 71 holding the pivot pin 29, spaced a predetermined distance from the pin 29. Both of these load arm pivots 29 and 29' include a center portion of enlarged diameter spanning across substantially the entire space between the two parallel bifurcated side plates 57 of the load arm. Both of these pivots have end portions of reduced diameter slidable along the slots 67.

For purposes of clamping the slide firmly in place, the outer surfaces of the load arm are serrated at 73, in areas extending along both edges of the slots 67 and with the individual teeth perpendicular to the slots. Serrated clamping blocks 77 are held engaged with these serrations 73 by pairs of lock nuts 79 on the threaded outer ends of the pivot pin 29.

By virtue of the fact that the links 71 and inner pivot pin 29' are entirely confined between the outer surfaces of the load lever 30, this slide 65 enables the load arm to be reduced to a very short effective length, because there is no interference between the short pivot pin 29' and the frame members 33 or spring arm 42. The clamping blocks 77 and lock nuts 79 on the ends of the outer pin 29 serve to hold both pivots 29 and 29' in the desired positions. The longer ends of the pin 29 do not cause interference with the frame members 33 or spring arm 42 because the pin 29 always remains spaced out by the links a substantial distance away from the main pivot, even when the pin 29' is in its innermost position.

In order to move the load rod eye 28 from the outer pin 29 to the inner pin 29', the whole slide 65 is moved out of the open end of the slot 67. Then, one of the links 71 is temporarily removed, and the eye of the load rod is slipped into its new position over the inner pivot. The pins 29 and 29' have a loose running fit in these links for easy removal and re-insertion.

A scale 75 (please see Figure 1) extends along near the slot 67 and conveniently shows the effective length of the load arm in inches. There are two sets of numbers, both of which are read with reference to a scribed line 81 on the clamping block opposite the center of the outer pivot 29. When the load rod is hanging from the outer pivot, the set of larger numbers is read, and vice versa when the load rod is hanging from the inner pivot.

Among the further advantages of this slide assembly are those resulting from the fact that the provision of the alternative load pivot pin 29' enables the serrated areas 73 to be one-half as long. Thus, the extent of machining is reduced. Also, it provides a saving in metal in the plates 140 because there are no serrations near the main pivot which would require an increase in thickness to offset the reduction in cross sectional area near the main pivot, where the bending moment is greatest.

As shown the load arm adjusts from an effective length of 1½ inches up to 3¾ inches when using the inner pivot pin 29'. The outer pivot pin 29 provides an adjustment from 3¾ inches out to 6 inches in this example.

For purposes of supplying a substantially constant supporting force to the load, spring means are used, here being shown for example as outer and inner coaxial compression springs 36 and 36', respectively. Depending upon the magnitude of the supporting force required either one or both may be used.

This compression spring means is mounted upon a swingable rectangular spring platform 39 having a pair of lugs projecting between the edges of the frame side plates 33. The lugs are pivotally anchored trunnion-fashion by a pair of shoulder screws 40 whose shanks have a loose running fit within holes in the side frame members 33, thus forming the spring-anchoring pivot.

At its outer end the spring means thrusts against a cap member 41 secured by a nut 72 to a spring rod 38 passing in along the axis of the spring and slidably fitting through a rigid guide tube 83 rigidly secured to the platform 39. The purpose of this rigid guide tube 83 is to assure that the tension rod 38 remains straight and does not tend to droop under the weight of the cantilevered free end of the spring means.

Any tendency for the rod 38 to bind in the tube 83 is prevented, as indicated in Figure 17, by making the internal diameter of the tube 83 at least 1/16 of an inch larger than the rod 38 with bearing sleeves 84 force-fitted into enlarged sockets in both ends of the tube and providing a freely sliding fit on the rod 38. The guide tube extends through a hole in the spring platform 39 and is welded thereto. Preferably the guide tube projects in both directions from the spring platform and is as long as possible, being just short of interference with the moving parts at opposite extremes of motion. As shown, the guide tube projects inwardly toward the pivot 43 a distance from the middle of the spring platform more than one-half its projection outwardly toward the cap member 41, thus providing the best support for the rod 38. This guide tube arrangement is claimed in my above-identified copending application. A clevis member 85 is screwed onto the inner end of the spring rod 38 and is pivotally carried by the adjustable spring arm pivot 43 which is positioned vertically above the main pivot 31 in the high position. As shown in Figure 21, this pivot 43 is formed by a headed pin passing through guideways in the lever formed by a pair of elongated slots 104 having their long axes extending radially away from the main pivot 31. A cotter pin 87 passes through the other end of the pin 43.

In order to adjust the load capacity of the hanger, the pivot 43 is slid along the guide by a load capacity adjustment mechanism including an eye bolt 100 whose eye is force-fitted onto the center of the pivot within the fork of the clevis member 85. Thus, the pivot pin 43 cannot rotate with respect to the adjusting bolt 100. The upper end of the adjustment bolt runs up through a hole in the lever top spacer 102 and is held in position by a pair of clamping nuts tightened against the top and bottom surfaces of the spacer. Convenient access to these clamping nuts is provided through the access opening 37. A matching opening 89 is formed near the top of the spring arm 42 by means of a cut out portion of the plates 138 providing access to the inner clamping nut. The arrangement and operation of this load-capacity adjustment mechanism in conjunction with the indicator 93 and scale 97 is described in detail and claimed in the copending application Serial No. 666,705 filed June 19, 1957. A projection 99 (please see Figures 17 and 22) on one of the spring lever side plates 138 carries the scale.

The angular position of the spring arm 42 is indicated by an arcuate scale 101 on the rounded vertex 19 and a pointer 103 on the spring lever near the main pivot.

*Method and apparatus for changing load-deflection characteristic of the spring*

Method and apparatus for changing the load-deflection characteristic of one or more springs of the spring support in order to obtain a more nearly constant supporting force are illustrated in detail in Figures 25 through 32. The load-deflection adjustment control, generally indicated at 186, includes a T-shaped spacer having a cylindrically curved back 188 and a spacer block 190 forming the stem of the T-shape. This control is held onto a coil of the outer spring 36 by means of a C-shaped spring retainer clip 192 which is nested in a curved hollow 194 against one side of the spacer block and against the curved back 188, as indicated most clearly in Figure 28.

The cylindrical curvature of the back 188 is arranged to be concentric with the outer spring as indicated in Figures 25 and 26. This T-shaped spacer is die cast, and the spring clip 192 is suitably secured thereto by brazing or welding.

The load-deflection adjustment control 186 is readily installed on the spring 36 by clipping onto a coil (such as the coil 196) when the spring is in relaxed condition. Then, the spacer block 190 projects between this coil and the next adjacent coil 197. As the spring is compressed (please see Figure 29) from its fully relaxed position, as represented by the point 200, the load deflection curve 201 initially rises as a straight line, for all of the convolutions move closer together. At a predetermined amount of compression, represented by the point 202, the spacer block 190 abuts up against the adjacent coil 197 so as to prevent further deflection of the particular convolution 198 which extends between the coils at 196 and 197. This effectively reduces the amount of "live" spring. Thus, upon further compression of the spring beyond the predetermined point the spring is stiffer, or in other words its load-deflection characteristic is boosted, as shown in Figure 29. Advantageously, this invention enables independent adjustment of the two factors: (1) the predetermined point in the travel at which the change in the load-deflection characteristic commences, and (2) the relative amount of the change. Both of these adjustments are explained further below.

It will be appreciated that this spring-characteristic control 186 does not affect the inner spring 36' and can be used regardless of whether or not an inner spring is used. When the supported load is of a smaller weight such that the inner spring alone is used, the spring characteristic control is then used for the inner spring. The control for the inner spring is the same as that shown, except, of course, it has a smaller radius of curvature and retainer clip so as to fit the smaller coils of the inner spring.

In the operation of compression springs in constant support hangers as shown, it is not desirable to arrange the spring travel such that the spring becomes fully compressed down to its solid height. I prefer to utilize a range of spring travel such that at one limit of travel the coils of the spring are fairly close together, but not touching at any point along the "active" length of the spring. And at the other limit of travel the coils are considerably farther apart.

In Figure 29, the predetermined inflexion position 202 at which the change in slope of the load-deflection curve begins is indicated as being at the mid-point of travel of the spring. In order to position the point of change 202 at the mid-position of spring travel, the thickness of the block 190 is established as indicated in Figure 27. That is, the total distance P between the adjacent coils 196 and 197 is measured with the spring arm 42 in its uppermost position. Then, the distance Q between these same coils is measured when spring is at the mid-point of its travel. The effective thickness of the block 190 (including the thickness of the wall of the clip 192) is made equal to the distance Q. By changing the thickness of the spacer block the curve 208 can be moved to any position, such as that beginning at 202' and continuing up along the line 208'.

The family of curves 208 and 208' etc., are all parallel, being the new load-deflection rate after one-half of a convolution is removed from active duty, i.e. neutralized.

In order to move the point of change 202 within the operating range 204 of the spring and progressively further above the "Mid" position, the effective thickness of the spacer block is progressively increased from Q toward P. For example, assuming that in a particular installation it is advantageous to have the point of change 202' half-way between the "Mid" and "High" positions, then the effective thickness of the spacer block is changed to the phantom line position 190' half way between Q and P.

In order to move the point of change 202 within the operating range 204 and progressively further below the "Mid" position, the effective thickness of the spacer block is progressively decreased from Q down toward a small residual value equal to P minus twice the difference between P and Q. That is, the residual value is:

(20) $$R = P - 2(P-Q) = 2Q - P$$

When the spacer block is decreased in thickness below this value R, it is too thin to have any effect within the operating range.

As was indicated in connection with Figure 16, when a boost in the steepness of the load-deflection rate is required, it is usually desirable to have this boost action begin at a point such as the point 202 which is somewhere near the mid-range of load travel.

*Method and apparatus for adjusting the slope of the changed spring characteristic*

As described above, the load-deflection adjustment control 186 enables a change to be made in the position of the point 202. This control also adjusts the slope of the changed spring characteristic.

A consideration of the details of the structure at the end of the spring 36 as illustrated in Figures 17, 18, 25 and 26 shows that this spring is terminated by "squaring" and grinding. Thus, from the point 206 on over to the right end, the spring abuts against itself or against the cap member 41. However, from the point 206 on toward the left the coils of the spring are free from engagement with each other.

When the control 186 is positioned on the coil at 196, as shown in Figures 25 and 27, then upon abutment against the adjacent coil, it neutralizes the deflection of one-half a convolution, namely between 196 and 206. Therefore, the control provides a changed load deflection rate beginning at the point 202 and continuing up along the changed slope line 208.

It is important to understand that from the point 197 (which is one-half a convolution to the right of the point 206) on over toward the left the pitch of the coils remains uniform (except for the left termination, which does not affect this consideration). Thus, advantageously, in sliding the control 186 from its position on the coil at 196 along the spring to a new position such as on the coil at 208, as shown in Figure 26, there is no effect upon the particular initial points 202 or 202' of action. These depend only on thickness, not on position.

However, this adjustment in position along the coil progressively increases the amount of neutralized spring from one-half of a convolution up to a full convolution. Thus, the slope 208 increases linearly with adjustment up to a steeper line 210. Similarly, the line 208' is adjustable in the range up to 210'.

A scale 212 extends around one half of the circumference of the cap 41 and indicates the adjustment.

The back portion 188 overlaps adjacent coils to prevent twisting of the spacer block. In certain cases a protector cup 214 may be held on by an additional nut 216. This cup includes staggered circumferential slots to see the position of the control 186.

Instead of putting the adjusting control 168 at the cantilevered end of the spring means it can also be positioned at the end near the spring-anchoring pivot.

Figure 31:
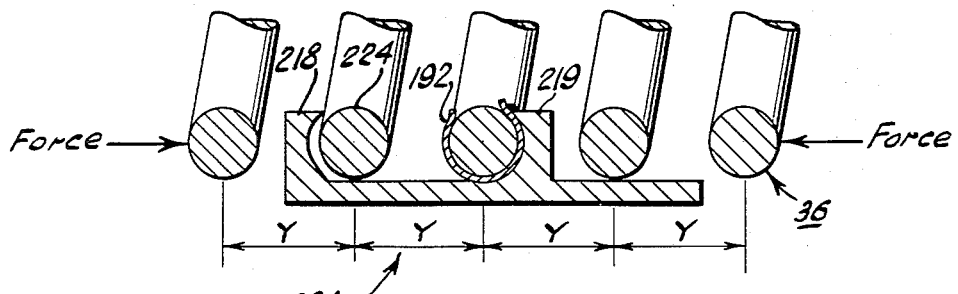
Figure 32:
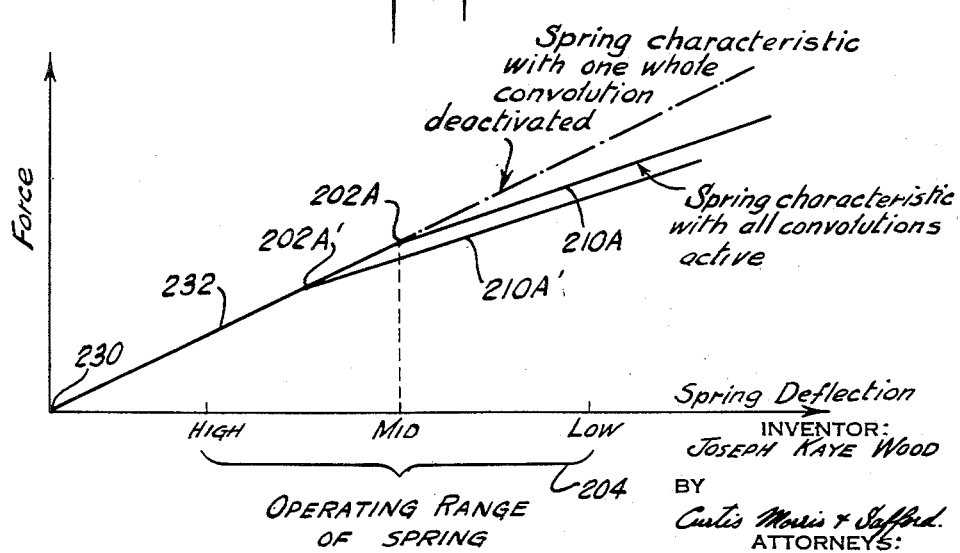
Figure 32 is a plot of spring force as a function of spring deflection for purposes of explanation of the method and operation of the load-deflection adjustment control of Figures 30 and 31.

Figures 30 and 31 show a modified characteristic adjustment control 168A including a cylindrically curved back 217 having a pair of confiner blocks 218 and 219 which straddle one whole convolution and retain the convolution partially compressed. For example, this convolution is shown in Figure 30 as being retained at ¾ of the spacing of the remainder of the spring when at the "High" position (please see Figure 32).

In effect the blocks 218 and back 217 form a U-shaped clamp having curved spring-engaging surfaces. The end portion 220 overlaps an adjacent coil 222 so as to prevent the control from twisting when the spring is compressed to such an extent that the coil 224 disengages from the curved seat of the retainer 218, as shown in Figure 31.

As the spring is compressed from its relaxed position 230 the load-deflection curve rises along a line 232 until the coil 224 leaves the block 218 at a point 202A, then an additional full convolution becomes "active." Thus, the load-deflection curve becomes less steep along the line 210A. By increasing the span between the blocks, the inflexion point 202A moves over toward the high position, as indicated at 202A', and vice versa. On a tension spring, a spacer block acts like the U-clamp 168A on compression spring; whereas a U-clamp on a tension spring acts like a spacer block 199 on a compression spring.

*Further methods and apparatus for making $\phi$-shift adjustments*

The spring support shown in Figures 33, 34, and 35 has an angular adjustment for $\phi$-shift between the load-arm pivot and the spring-arm pivot provided by means of counter threaded stub shafts 231 and 232 projecting from opposite sides of the side bars 138 of the spring lever 42. The stub shaft 231 has an outer portion 234 with a left-hand thread and an inner portion 236 with a right-hand thread. The other stub shaft 232 is just the reverse of this, having an outer portion 238 with a right-hand thread and an inner portion 240 with a left-hand thread.

These stub shafts 231 and 232 are hollow and contain sleeve bearings 242 riding on the polished inner ends 243 of bearing bolts 31 which are screwed through sockets 244 in the side frames 33.

The load arm side plates 140 are screwed onto the inner stub shaft portions 236 and 240. Their relationship is such that the load moment tends to turn the side plates outwardly on their respective portions of the stub shafts. Annular clamping collars 246 and 248 are screwed onto the respective stub-shaft outer portions 234 and 238, respectively, and rigidly lock the load arm in place. These collars are recessed at 249 so as to clear the larger diameter of the inner portions of the stubshafts.

In order to make a $\phi$-shift adjustment, these annular collars 246 and 248 are backed off slightly so as to free the load arm lever 30, which is then swung to the new position. The clamping collars are then screwed on tightly against the load arm side plates 140 rigidly to hold the load arm in the new position.

The load capacity adjustment is similar to that of Figures 1 through 11, and includes an adjusting disk 98 having wrench sockets 118 therein. This disk is mounted between a pair of transverse bearing members 112 and is screwed onto an eye bolt 100 for shifting the position of the spring arm pivot 43 radially along the slot 104 in the arm 42. A scale 95 and pointer 96 indicates this adjustment.

As used herein "load-arm" and "load-supporting arm" are synonymous. Also "load-arm pivot" and "support-arm load pivot" are synonymous.

This application is a continuation-in-part of my prior copending application Serial No. 384,961, filed October 7, 1953, now Patent 2,896,888, and presents subject matter divided therefrom.

I claim:
1. A spring support for exerting a constant vertical pull on a load constrained to move upwardly and downwardly within a limited range comprising a frame, a lever system including a load arm and a spring arm, a main pivot rotatably mounting said lever system on said frame, a coil spring, anchoring means on the frame to which said spring is connected, a spring pivot connection on said spring arm connecting said spring to said spring arm and having its axis parallel with the axis of said main pivot to produce a turning moment on said lever system about the main pivot, and a load-arm pivot having its axis parallel to the main pivot and connecting the load to said load arm so as to oppose the spring, said lever system being rotatable about said main pivot with said load-arm pivot movable along an arc from a high position through a horizontal position to a low position, a load-supporting element carried by said load-arm pivot and extending downwardly therefrom, and a third pivot connecting the lower end of said load-supporting element to the load, said third pivot being offset horizontally in a direction toward the main pivot from the region vertically beneath said arc, a vertical load line through said third pivot by-passing said high and low positions of the load-arm pivot on the side thereof toward the main pivot.

2. A spring support for exerting a constant supporting force upon a load movable upwardly and downwardly within a limited range and constrained to follow a predetermined path comprising a frame, a lever assembly, said lever assembly having a load-supporting arm and a spring arm, a main pivot connecting said lever assembly to said frame, one of said arms being pivotally mounted in the lever assembly for swinging movement about the axis of the main pivot with respect to the other arm, a load pivot on said load arm having its axis parallel to said main pivot, means for connecting the load to be supported to said load pivot for producing a turning moment on said lever assembly about said main pivot, a spring, anchoring means mounting said spring on said frame, a spring pivot on said spring arm having its axis parallel with said main pivot, said spring being connected between said spring pivot and said anchoring means for producing a turning moment on said lever assembly opposed to the load and an adjustment mechanism for adjusting the angular position about the main pivot of one of said arms with respect to the other and for securing said arms with the desired angular relationship therebetween.

3. A constant support spring hanger for supporting movable loads such as piping and the like of the type having a frame, at least one coil spring, a spring-anchoring pivot mounting said spring on the frame, a lever assembly including a load arm and a spring arm, a main pivot mounting said lever assembly on the frame, said spring arm being connected to the spring for transmitting the force of the spring thereto, means for connecting the load to the load arm for transmitting the load thereto, one of said arms being swingably mounted on the lever assembly for swinging movement about the axis of the main pivot with respect to the other arm, an abutment secured to one of said arms, and an adjustable member releasably secured to and carried by the other arm and engaging said abutment for adjusting the angle at the main pivot between said arms and for holding the desired angle after adjustment has been made.

4. A constant support spring hanger for supporting movable loads such as piping and the like of the type having a frame, at least one spring, a spring-anchoring pivot mounting said spring on the frame, a lever assembly including a load arm and a spring arm, a main pivot mounting said lever assembly on the frame, said spring arm being connected to the spring for transmitting the force of the spring thereto, means for connecting the load to the load arm for transmitting the load thereto, one of said arms being pivotally mounted with respect to the other arm and swingable about the axis of the main pivot with respect to the other arm, means carried by one of said arms defining a threaded opening having its axis directed toward the other arm, and a screw member fitting into said threaded opening and extending into engagement with the other arm, said screw member being rotatable in said threaded opening for swinging said pivotally mounted arm with respect to the other, thereby adjusting the angle at the main pivot between said arms.

5. A spring support for exerting a constant vertical pull on a load movable up and down within a limited range and constrained to follow a predetermined path comprising a frame, a lever system including a load arm and a spring arm, a main pivot mounting said lever system on said frame, a coil spring anchored to the frame, a first pivot on said spring arm connecting said spring thereto for producing a turning moment about the main pivot, a second pivot on said load arm connecting the load thereto for producing a turning moment about the main pivot opposed to the spring, said pivots having their axes parallel with said main pivot, said load arm having a slot therein extending radially therein with respect to the main pivot, said second pivot having a threaded portion and being slidable along said slot for adjusting the effective length of the load arm, serrations on at least one side of said load arm adjacent to, and transverse to the axis of said slot, a clamping block on said pivot having a serrated surface for gripping said serrations, and a clamping nut on said threaded portion of the second pivot for pressing said clamping block against said serrations.

6. A constant support spring-balanced hangar for supporting movable loads such as piping and the like including a frame having a main pivot, a body rotatable about said main pivot, a load-supporting member being connected at its upper end to said body by a first pivot spaced radially from said main pivot for exerting a load moment on said body about said main pivot, said first pivot during operation swinging through an arc about the main pivot extending between extreme positions above and below a horizontal line through the main pivot, the height of said arc being "S" as measured perpendicularly to a chord passing through said extreme positions, a spring carried by the frame and connected to said body by a second pivot spaced radially from said main pivot for exerting a spring moment on said body about said main pivot opposed to said load moment, a third pivot for connecting the lower end of said load-supporting member to the load, said third pivot being offset horizontally toward the direction of said main pivot from a vertical relationship with respect to said extreme positions by a distance of approximately $S/2$.

7. A spring support for exerting a constant supporting force upon a load movable upwardly and downwardly within a limited range and constrained to follow a predetermined path comprising a frame, a lever assembly, said lever assembly having a load-supporting arm and a spring arm, a main pivot connecting said lever assembly to said frame, one of said arms including a shaft portion concentric with the main pivot, the other arm being carried by said shaft portion and being swingable about the shaft portion concentric with the main pivot, a load pivot on said load arm having its axis parallel to said main pivot, means for connecting the load to be supported to said load pivot for producing a turning moment on said lever assembly about said main pivot, a spring, anchoring means mounting said spring on said frame, a spring pivot on said spring arm having its axis parallel with said main pivot, said spring being connected between said spring pivot and said anchoring means for producing a turning moment on said lever assembly opposed to the load, and a clamping mechanism releasable for adjusting the angular position about the main pivot of one of said arms with respect to the other and adapted for clamping said arms in the desired angular relationship.

8. A spring support as claimed in claim 7 and wherein said shaft portion has first and second oppositely threaded regions adjacent to one another, said other arm being screwed onto the first of said threaded regions and being swingable about said threaded region concentric with the main pivot for adjusting the angle between said arms, and a clamping collar screwed onto the second of said threaded regions for holding said other arm at the desired angular position.

9. A spring support for exerting a constant vertical pull on a load movable up and down within a limited range, comprising a frame, a lever system including a load arm and a spring arm, a main pivot mounting said lever system on said frame, a coil spring anchored to the frame, a pivot on said spring arm connecting said spring thereto, said load arm having a slot extending out radially from the main pivot to accommodate the load pivot for substantial range of load travel distances and extending both beyond and behind said frame, a pair of spaced parallel pivots engaging in said slot and both being adjustable in position along said slot, at least one link having a pair of parallel openings therein, each of said openings engaging a respective one of said pair of pivots and holding them in spaced parallel relationship in said slot, external means for locking said pivots in any of a plurality of positions along said slot, and load-supporting means adapted to be removably secured to either of said pair of pivots.

10. A spring support as defined in claim 9 wherein the slots extends to the outer end of said load arm for insertion and removal of said two pivots.

11. A support for piping and the like including a frame, a lever system having a load arm, a main pivot mounting said lever system on the frame, at least one coil spring carried on the frame and being pivotally connected to said lever system, said load arm including two parallel side elements spaced apart in a direction axially with respect to said main pivot, each of said side elements having a slot therein extending along a substantial part of its entire length, said slots in said side elements being parallel, a load-arm-length adjusting mechanism including a pair of parallel pivots spanned between said side elements and engaging in said slots, at least one link element having a pair of parallel openings therein, each of said openings engaging a respective one of said pivots and holding them in spaced parallel relationship, said pivots and link being adjustable in position along said load arm, the one of said pivots spaced farthest from the main pivot having its ends threaded, a pair of serrated clamping blocks engaging the outer surfaces of said side elements adjacent to said slots, a pair of nuts on said threaded ends holding said clamping blocks in place, the outer surfaces of said side elements being serrated adjacent to said slots, and load-supporting means removably engaging one of said pivots between said side elements.

12. A support as claimed in claim 11 and wherein said slots extend out to the ends of said side elements, said pivots being removable out of the open ends of said slots.

13. Apparatus for adjusting the load-deflection rate of a coil spring comprising a T-shaped member, the stem portion of the T-shaped member being adapted to be inserted between a pair of adjacent convolutions of the coil spring, the back portion of the T-shaped member being adapted to overlap the adjacent convolutions, and a retainer for holding the stem portion in position between the convolutions.

14. Apparatus for adjusting the load-deflection rate of a coil spring comprising a load-deflection control member having a back portion adapted to overlap at least three consecutive convolutions of the coil spring, at least one block portion projecting inwardly from the back portion and adapted to extend between two adjacent convolutions of said three consecutive convolutions, and a spring retainer adapted to hold one of said two convolutions adjacent to said block portion.

15. Apparatus for adjusting the load-deflection rate of a coil spring comprising a load-deflection control member having a back portion adapted to extend along beside at least three consecutive convolutions of the coil spring, a pair of spaced elements projecting from said back portion adapted to extend into a pair of spaces between the convolutions of the spring, and a C-shaped spring clip secured to said back portion and adapted to clip onto a convolution of the spring for retaining said control member in position on the spring.

16. Apparatus for adjusting the load-deflection relationship of a compression spring having a termination wherein a first portion of the spring near the end abuts against the end portion of the spring, said first portion having a pitch corresponding with the pitch of the adjacent free convolution, and a load-deflection control member including a spacer element inserted into the space between the first portion of the spring and said adjacent free convolution and movable along said space for controlling the amount of said free convolution which is neutralized when said spacer engages both said free convolution and said first portion.

17. Apparatus for adjusting the load-deflection characteristic of a compression coil spring comprising a support for supporting one end of the spring, said support having a curved surface near to and generally concentric with the axis of the spring, a graduated scale extending around said curved surface, and a load-deflection control member extending into the space between the last free convolution of the spring and the end portion of the spring, said load-deflection control member being adjustable in position along said space for controlling the amount of the last free convolution of the spring neutralized thereby, and said graduated scale indicating the adjustment.

References Cited in the file of this patent
UNITED STATES PATENTS

| | | |
|---|---|---|
| 2,290,034 | Carter | July 14, 1942 |
| 2,395,730 | Farkas | Feb. 26, 1946 |
| 2,535,305 | Loepsinger | Dec. 26, 1950 |
| 2,656,997 | Holman | Oct. 27, 1953 |